United States Patent [19]

Graves

[11] Patent Number: 5,724,438
[45] Date of Patent: Mar. 3, 1998

[54] METHOD OF GENERATING MODIFIED PATTERNS AND METHOD AND APPARATUS FOR USING THE SAME IN A CURRENCY IDENTIFICATION SYSTEM

[75] Inventor: Bradford T. Graves, Arlington Heights, Ill.

[73] Assignee: Cummins-Allison Corp., Mt. Prospect, Ill.

[21] Appl. No.: 394,752

[22] Filed: Feb. 27, 1995

Related U.S. Application Data

[63] Continuation-in-part of Ser. No. 340,031, Nov. 14, 1994, and Ser. No. 127,334, Sep. 27, 1993, Pat. No. 5,467,405, which is a continuation of Ser. No. 885,648, May 19, 1992, Pat. No. 5,295,196, which is a continuation-in-part of Ser. No. 475, 111, Feb. 5, 1990, abandoned, said Ser. No. 340,031, Nov. 14, 1994, is a continuation-in-part of Ser. No. 243,807, May 16, 1994, Pat. No. 5,633,949, and Ser. No. 207,592, Mar. 8, 1994, Pat. No. 5,467,406, which is a continuation-in-part of Ser. No. 127,334, May 19, 1992, said Ser. No. 243,807, May 16, 1994, is a continuation-in-part of Ser. No. 127,334, Sep. 27, 1993, and Ser. No. 219,093, Mar. 29, 1994, abandoned, which is a continuation-in-part of Ser. No. 127,334, Sep. 27, 1993.

[51] Int. Cl.$^6$ .................................................. G06K 9/00
[52] U.S. Cl. ........................... 382/135; 382/320; 382/321
[58] Field of Search ........................... 382/135, 159, 382/160, 209, 215, 320, 321, 322, 323; 235/379; 250/556; 356/71; 209/534

[56] References Cited

U.S. PATENT DOCUMENTS

| D. 369,984 | 5/1996 | Larsen | D10/97 |
| 3,246,295 | 4/1966 | De Claris et al. | 382/56 |

(List continued on next page.)

FOREIGN PATENT DOCUMENTS

| 0077464 | 4/1983 | European Pat. Off. |
| 0338123 | 10/1989 | European Pat. Off. |

(List continued on next page.)

OTHER PUBLICATIONS

Chp. 7 of Mosler CF–420 Cash management System, Operator's Manual, © 1989.

Drawings of portions of Mosler CF–4210 Cash Management System (FIGs A–C) and description of the same (1989).

(List continued on next page.)

*Primary Examiner*—Leo Boudreau
*Assistant Examiner*—Phuoc Tran
*Attorney, Agent, or Firm*—Arnold, White & Durkee

[57] ABSTRACT

An improved method of generating modified scanned or master patterns for use in a discrimination system capable of identifying one or more currency bills. Each of the scanned and master patterns comprises a sequence of data values representing analog variations of characteristic information along a segment of a bill and each pattern has a leading end and a trailing end. Each of the data values has an associated sequence position. The modified scanned or master patterns are generated by designating either the scanned pattern or the master pattern for modification and inserting a predetermined number, R, of data values at either the trailing end of the sequence of data values of the designated pattern when the modification is performed in the forward direction or the leading end of the sequence of data values of the designated pattern when the modification is performed in the backward direction. This modification effectively removes R data values from the leading or trailing end of the designated pattern. Either the last R data values of the designated pattern are set equal to the last R data values of the non-designated pattern when the modification is performed in the forward direction or the first R data values of the designated pattern are set equal to the first R data values of the non-designated pattern when the modification is performed in the backward direction. Alternatively, the modified master patterns are generated by inserting R data samples at the leading or trailing ends of the master patterns and by setting the first R or last R data samples of the modified master pattern equal to zero.

33 Claims, 11 Drawing Sheets

U.S. PATENT DOCUMENTS

| | | | |
|---|---|---|---|
| 3,280,974 | 10/1966 | Riddle et al. | 209/111.8 |
| 3,480,785 | 11/1969 | Aufderheide | 250/219 |
| 3,496,370 | 2/1970 | Haville et al. | 250/219 |
| 3,509,535 | 4/1970 | Berube | 340/149 |
| 3,612,835 | 10/1971 | Andrews et al. | 235/61.11 D |
| 3,679,314 | 7/1972 | Mustert | 356/71 |
| 3,778,628 | 12/1973 | Novak et al. | 250/556 |
| 3,870,629 | 3/1975 | Carter et al. | 209/111.8 |
| 3,906,449 | 9/1975 | Marchak | 340/149 R |
| 3,976,198 | 8/1976 | Carnes et al. | 209/111.7 T |
| 4,041,456 | 8/1977 | Ott et al. | 340/146.3 R |
| 4,096,991 | 6/1978 | Iguchi | 235/419 |
| 4,114,804 | 9/1978 | Jones et al. | 235/476 |
| 4,147,430 | 4/1979 | Gorgone et al. | 356/51 |
| 4,179,685 | 12/1979 | O'Maley | 340/146.3 H |
| 4,250,806 | 2/1981 | Boyson et al. | 101/2 |
| 4,255,651 | 3/1981 | Phillips | 235/92 |
| 4,283,708 | 8/1981 | Lee | 340/146.3 Z |
| 4,288,781 | 9/1981 | Sellner et al. | 340/146.3 Q |
| 4,302,781 | 11/1981 | Ikeda et al. | 358/486 |
| 4,311,914 | 1/1982 | Huber | 250/556 |
| 4,334,619 | 6/1982 | Horino et al. | 209/551 |
| 4,348,656 | 9/1982 | Gorgone et al. | 340/146.3 R |
| 4,349,111 | 9/1982 | Shah et al. | 209/534 |
| 4,352,988 | 10/1982 | Ishida | 250/559 |
| 4,355,300 | 10/1982 | Weber | 340/146.3 C |
| 4,356,473 | 10/1982 | Freudenthal | 340/146.3 H |
| 4,381,447 | 4/1983 | Horvath et al. | 250/223 |
| 4,386,432 | 5/1983 | Nakamura et al. | 382/135 |
| 4,442,541 | 4/1984 | Finkel et al. | 382/7 |
| 4,461,028 | 7/1984 | Okubo | 382/15 |
| 4,464,786 | 8/1984 | Nishito et al. | 382/7 |
| 4,464,787 | 8/1984 | Fish et al. | 382/7 |
| 4,490,846 | 12/1984 | Ishida et al. | 382/7 |
| 4,513,439 | 4/1985 | Gorgone et al. | 382/7 |
| 4,539,702 | 9/1985 | Oka | 382/7 |
| 4,556,140 | 12/1985 | Okada | 194/4 |
| 4,563,771 | 1/1986 | Gorgone et al. | 382/7 |
| 4,587,412 | 5/1986 | Apisdorf | 235/449 |
| 4,587,434 | 5/1986 | Roes et al. | 250/556 |
| 4,592,090 | 5/1986 | Curl et al. | 209/7 |
| 4,628,194 | 12/1986 | Dobbins et al. | 235/379 |
| 4,645,936 | 2/1987 | Gorgone | 250/556 |
| 4,653,647 | 3/1987 | Hashimoto | 209/534 |
| 4,677,682 | 6/1987 | Miyagawa et al. | 382/7 |
| 4,700,368 | 10/1987 | Munn et al. | 377/8 |
| 4,733,308 | 3/1988 | Nakamura et al. | 358/496 |
| 4,764,976 | 8/1988 | Kallin et al. | 382/65 |
| 4,823,393 | 4/1989 | Kawakami | 382/7 |
| 4,827,531 | 5/1989 | Milford | 382/7 |
| 4,881,268 | 11/1989 | Uchida et al. | 382/7 |
| 4,973,851 | 11/1990 | Lee | 250/556 |
| 4,992,860 | 2/1991 | Hamaguchi et al. | 358/75 |
| 4,996,604 | 2/1991 | Ogawa et al. | 358/486 |
| 5,047,871 | 9/1991 | Meyer et al. | 358/486 |
| 5,055,834 | 10/1991 | Chiba | 382/135 |
| 5,068,519 | 11/1991 | Bryce | 235/449 |
| 5,122,754 | 6/1992 | Gotaas | 324/676 |
| 5,163,672 | 11/1992 | Mennie | 271/187 |
| 5,167,313 | 12/1992 | Dobbins et al. | 194/317 |
| 5,201,295 | 4/1993 | Takizawa et al. | 194/206 |
| 5,207,788 | 5/1993 | Geib et al. | 271/122 |
| 5,261,518 | 11/1993 | Bryce | 194/206 |
| 5,295,196 | 3/1994 | Raterman et al. | 382/7 |
| 5,341,408 | 8/1994 | Melcher et al. | 377/8 |
| 5,430,664 | 7/1995 | Cargill et al. | 364/550 |
| 5,467,405 | 11/1995 | Raterman et al. | 382/135 |
| 5,467,406 | 11/1995 | Graves et al. | 382/135 |
| 5,633,949 | 5/1997 | Graves et al. | 382/135 |

FOREIGN PATENT DOCUMENTS

| | | |
|---|---|---|
| 0342647 | 11/1989 | European Pat. Off. |
| WO 90/07165 | 6/1990 | WIPO |
| WO 91/11778 | 8/1991 | WIPO |
| WO 92/17394 | 10/1992 | WIPO |
| WO 93/23824 | 11/1993 | WIPO |
| WO 94/19773 | 9/1994 | WIPO |
| WO 96/10800 | 4/1995 | WIPO |
| WO 95/24691 | 9/1995 | WIPO |

OTHER PUBLICATIONS

JetScan Currency Scanner/Counter, Model 4060, Operator's Manual by Cummins–Allison (Aug. 1991).

Sale of JetScan Currency Scanner/Counter, Model 4060 (Aug. 1991).

JetScan Currency Scanner/Counter, Model 4061, Operating Instructions by Cummins–Allison (Apr. 20, 1993).

Sale of JetScan Currency Scanner/Counter, Model 4061 (Apr. 20, 1993).

JetScan Currency Scanner/Counter Model 4062, Operating Instructions by Cummins–Allison (Nov. 28, 1994).

Sale of JetScan Currency Scanner/Counter Model, 4062 (Nov. 28, 1994).

AFB Currency Recognition System (1982).

Mosler Inc. brochure "The Mosler/Toshiba CF–420", 1989.

AFB Currency Recognition System (Not Dated).

METHOD OF GENERATING MODIFIED PATTERNS AND METHOD AND APPARATUS FOR USING THE SAME IN A CURRENCY IDENTIFICATION SYSTEM

CROSS-REFERENCE TO RELATED APPLICATIONS

This application is a continuation-in-part of U.S. patent application Ser. No. 08/127,334 filed Sep. 27, 1993, now U.S. Pat. No. 5,467,405, for a "Method and Apparatus for Currency Discrimination and Counting" and pending U.S. patent application Ser. No. 08/340,031 filed Nov. 14, 1994, for a "Method and Apparatus for Discrimination and Counting Documents," said U.S. patent application Ser. No. 08/127,334 is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting," said U.S. patent application Ser. No. 08/340,031 is a continuation-in-part of U.S. patent application Ser. No. 08/243,807 filed May 16, 1994, now U.S. Pat. No. 5,633,949, for "Method And Apparatus For Currency Discrimination" and Ser. No. 08/207,592 filed Mar. 8, 1994, now U.S. Pat. No. 5,467,406, for "Method and Apparatus for Currency Discrimination," both of which are continuations-in-part of Ser. No. 08/127,334 filed Sep. 27, 1993, for a "Method and Apparatus for Currency Discrimination and Counting," which is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting." Furthermore, U.S. patent application Ser. No. 08/243,807 is also a continuation-in-part of U.S. patent application Ser. No. 08/219,093 filed Mar. 29, 1994, abandoned for a "Currency Discriminator and Authenticator" which is a continuation-in-part of Ser. No. 08/127,334 filed Sep. 27, 1993, for a "Method and Apparatus for Currency Discrimination and Counting," which is a continuation of U.S. patent application Ser. No. 07/885,648, filed on May 19, 1992, and issued as U.S. Pat. No. 5,295,196, for a "Method and Apparatus for Currency Discrimination and Counting," which is a continuation-in-part of abandoned U.S. patent application Ser. No. 07/475,111, filed Feb. 5, 1990, for a "Method and Apparatus for Currency Discrimination and Counting."

BACKGROUND OF THE INVENTION

1. Field of the Invention

The present invention relates, in general, to currency identification. More specifically, the present invention relates to an apparatus and method for identifying different types of currency bills such as bills of different denominations.

2. Background

A variety of techniques and apparatus have been used to satisfy the requirements of automated currency handling systems. At the lower end of sophistication in this area of technology are systems capable of handling only a specific type of currency, such as a specific dollar denomination, while rejecting all other currency types. At the upper end are complex systems which are capable of identifying and discriminating among and automatically counting multiple currency denominations.

Currency discrimination systems typically employ either magnetic sensing or optical sensing for discriminating among different currency denominations. Magnetic sensing is based on detecting the presence or absence of magnetic ink in portions of the printed indicia on the currency by using magnetic sensors, usually ferrite core-based sensors, and using the detected magnetic signals, after undergoing analog or digital processing, as the basis for currency discrimination. A variety of currency characteristics can be measured using magnetic sensing. These include detection of patterns of changes in magnetic flux, patterns of vertical grid lines in the portrait area of bills, the presence of a security thread, total amount of magnetizable material of a bill, patterns from sensing the strength of magnetic fields along a bill, and other patterns and counts from scanning different portions of the bill such as the area in which the denomination is written out.

The more commonly used optical sensing techniques, on the other hand, are based on detecting and analyzing variations in light reflectance or transmissivity characteristics occurring when a currency bill is illuminated and scanned by a strip of focused light. The subsequent currency discrimination is based on the comparison of sensed optical characteristics with prestored parameters for different currency denominations, while accounting for adequate tolerances reflecting differences among individual bills of a given denomination. A variety of currency characteristics can be measured using optical sensing. These include detection of a bill's density, color, length and thickness, the presence of a security thread and holes, and other patterns of reflectance and transmission. Color detection techniques may employ color filters, colored lamps, and/or dichroic beamsplitters.

In addition to magnetic and optical sensing, other techniques of detecting characteristic information of currency include electrical conductivity sensing, capacitive sensing (such as for watermarks, security threads, thickness, and various dielectric properties) and mechanical sensing (such as for limpness and thickness).

Recent currency discriminating systems rely on comparisons between a scanned pattern obtained from a subject bill and sets of stored master patterns for the various denominations among which the system is designed to discriminate. As a result, the ability of a system to accurately line up the scanned patterns to the master patterns to which they are being compared is important to the ability of a discrimination system to discriminate among bills of various denominations as well as between genuine bills and counterfeit bills without rejecting an unacceptable number of genuine bills. However, the ability of a system to line up scanned and master patterns is often hampered by the improper initiation of the scanning process which results in the generation of scanned patterns. If the generation of scanned patterns is initiated too early or too late, the resulting pattern will not correlate well with the master pattern associated with the identity of the currency; and as a result, a genuine bill may be rejected. There are a number of reasons why a discrimination system may initiate the generation of a scanned pattern too early or too late, for example, stray marks on a bill, the bleeding through of printed indicia from one bill in a stack onto an adjacent bill, the misdetection of the beginning of the area of the printed indicia which is desired to be scanned, and the reliance on the detection of the edge of a bill as the trigger for the scanning process coupled with the variance, from bill to bill, of the location of printed indicia relative to the edge of a bill.

SUMMARY OF THE INVENTION

It is an object of the present invention to provide an improved method and apparatus for discriminating among currency bills comprising a plurality of currency denominations.

It is another object of the present invention to provide an improved method and apparatus for identifying a currency as belonging to a set of one or more currency bills.

It is another object of the present invention to provide an improved method and apparatus for determining the identity of a currency bill.

It is another object of the present invention to provide an improved method of generating modified scanned patterns.

It is another object of the present invention to provide an improved method of generating modified master patterns.

It is another object of the present invention to provide an improved method and apparatus for determining the identity of a currency bill by comparing a modified version of a scanned pattern with one or more master patterns.

It is another object of the present invention to provide an improved method and apparatus for determining the identity of a currency bill by comparing modified versions of one or more master patterns with a scanned pattern.

It is another object of the present invention to provide an improved method and apparatus using an improved pattern generation method for improving the ability of a discrimination system to accurately reject improper bills while reducing the likelihood of rejecting genuine bills.

It is another object of this invention to provide an improved method and apparatus of the above kind which is capable of efficiently discriminating among bills of several currency denominations at a high speed and with a high degree of accuracy.

Briefly, in accordance with the present invention, the objectives enumerated above are achieved by repetitively comparing a scanned pattern with multiple sets of master patterns until a sufficient match is found, or alternatively, by repetitively comparing a set of original master patterns with multiple scanned patterns until a sufficient match is found. The multiple sets of master patterns comprise an original set of master patterns plus one or more sets of modified versions of the original master patterns. The multiple scanned patterns comprise an original scanned pattern plus one or more modified versions of the original scanned patterns. Each modified pattern comprises one or more replicated data values from a corresponding original pattern to which each modified pattern is to be compared. Alternatively, each modified master pattern comprises one or more data values which are set equal to zero.

Briefly, in accordance with a preferred embodiment, an improved method of generating modified scanned or master patterns for use in a discrimination system capable of identifying one or more currency bills is provided. Each of the scanned and master patterns comprises a sequence of data values representing analog variations of characteristic information along a segment of a bill and each pattern has a leading end and a trailing end. Each of the data values has an associated sequence position. The modified scanned or master patterns are generated by designating either the scanned pattern or the master pattern for modification and inserting a predetermined number, R, of data values at either the trailing end of the sequence of data values of the designated pattern when the modification is performed in the forward direction or the leading end of the sequence of data values of the designated pattern when the modification is performed in the backward direction. This modification effectively removes R data values from the leading or trailing end of the designated pattern. Either the last R data values of the designated pattern are set equal to the last R data values of the non-designated pattern when the modification is performed in the forward direction or the first R data values of the designated pattern are set equal to the first R data values of the non-designated pattern when the modification is performed in the backward direction. Alternatively, the modified master patterns are generated by inserting R data samples at the leading or trailing ends of the master patterns and by setting the first R or last R data samples of the modified master pattern equal to zero.

According to a preferred method, a modified scanned pattern is generated by removing a predetermined number of leading or trailing data values of an original scanned pattern. Trailing or leading data values, respectively, are added to the modified scanned pattern with the added data values being copied from corresponding sequence positions of a corresponding master pattern. Alternatively, instead of explicitly removing leading or trailing data values, the leading or trailing data values may be effectively removed by adding data values to the opposite end of the scanned pattern and treating the modified scanned pattern as not including the "removed" leading or trailing data values.

According to another preferred method, a modified master pattern is generated in a similar manner except that added trailing or leading data values of the modified master pattern are set equal to data values copied from corresponding sequence positions of a scanned pattern.

According to another preferred method, a modified master pattern is generated in a similar manner except that added trailing or leading data values of the modified master pattern are set equal to zero.

The above described modified patterns or pattern generation methods may be employed in currency identification systems to compensate for misalignment between scanned and master patterns.

According to another preferred method, a scanned pattern comprising a number of data values is compared with one or more master patterns also comprising a number of data values. The scanned and master patterns represent analog variations in characteristic information retrieved from bills along corresponding segments. For example, the patterns may comprise 64 data values generated by sampling the output of a photodetector as a bill is moved relative to a scanhead, the output of the photodetector representing analog variation in the reflectance of light along a given segment of the bill. If none of the master patterns sufficiently match the scanned pattern, the scanned pattern may be modified and the modified scanned pattern compared to the master patterns. For example, data values #1 and #2 may be removed from the scanned pattern sequence, scanned patterns #3 and #4 may be made the first and second values in the modified sequence with subsequent data values modified accordingly. As a result of such a process, the original data values #63 and #64 now become modified data values #61 and #62. As a result of the above steps an incomplete modified pattern of data values #1–#62 is generated. According to a preferred embodiment, modified data values #63 and #64 are generated by replicating data values #63 and #64 of the master patterns to which the modified scanned pattern is to be compared. If the modified patterns do not sufficiently match any of the master patterns, the modification process may be reiterated except that new scanned modified values #61–#64 are generated by replicating master pattern values #61–#64. This process is repeated until a sufficient match is found or until a predetermined number of modification iterations have occurred. According to another preferred embodiment, scanned patterns may be modified backwards instead of the forward modification described above.

According to another preferred embodiment, master patterns may be modified instead of scanned patterns. According to this method, data values from scanned patterns are replicated into appropriate locations in modified master pattern sequences.

According to another preferred embodiment, trailing or leading sequence positions of modified master patterns may be filled with zeros instead of replicated data values from a scanned pattern to which modified master patterns are to be compared.

According to another preferred embodiment, modified master patterns with trailing or leading data values equal to zero are stored in a memory of an identification system along with corresponding unmodified master patterns, the master patterns and modified master patterns being stored before a bill under test is scanned by the identification system. When a bill under test is scanned by the identification system it is compared to one or more of the master patterns. If the identity of the bill can not be determined based on this comparison, the scanned pattern pattern is compared with one or more of the modified master patterns. This process can be repeated, with the scanned pattern being compared to multiply modified master patterns if necessary.

BRIEF DESCRIPTION OF THE DRAWINGS

Other objects and advantages of the invention will become apparent upon reading the following detailed description in conjunction with the drawings in which.

DETAILED DESCRIPTION OF THE PREFERRED EMBODIMENTS

Figure 1:
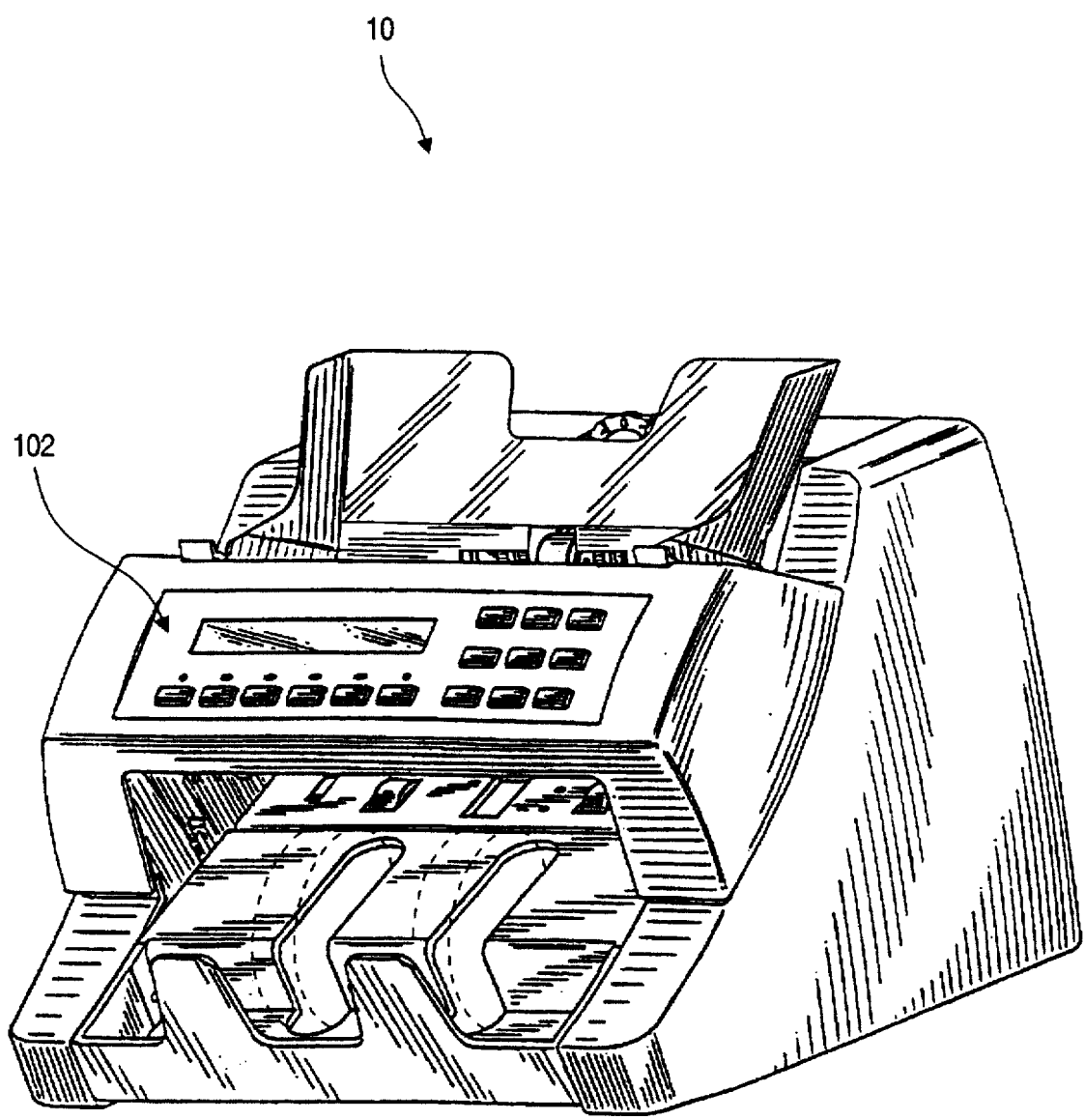
FIG. 1 is a perspective view of a currency scanning and counting machine embodying the present invention.
Figure 2:
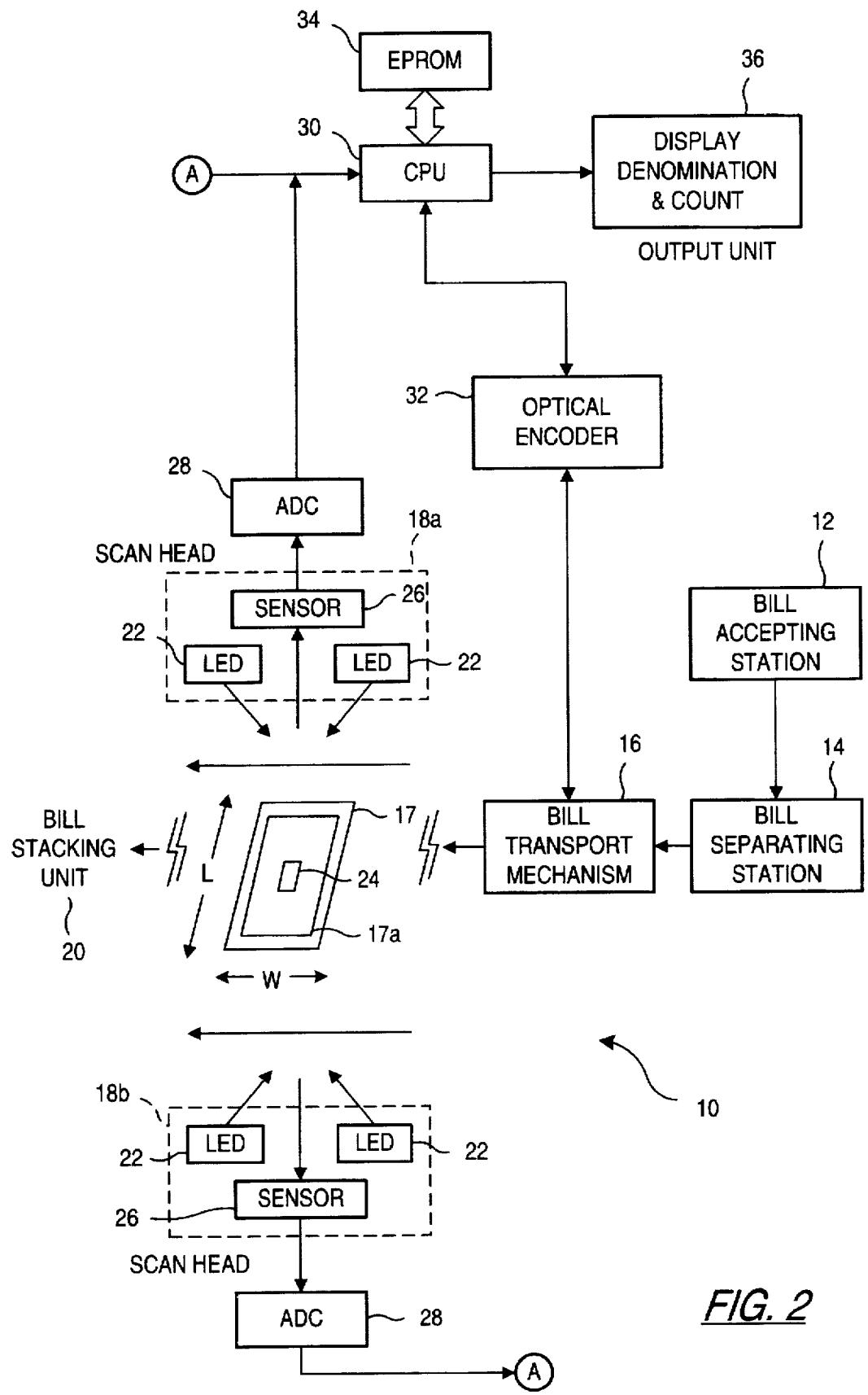
FIG. 2 is a functional block diagram of the currency scanning and counting machine of FIG. 1.

Referring now to FIGS. 1 and 2, there is shown a preferred embodiment of a currency discriminating system 10 according to the present invention. The system 10 includes an input receptacle or bill accepting station 12 where stacks of currency bills that need to be identified and counted are positioned. Bills in the input receptacle are acted upon by a bill separating station 14 which functions to pick out or separate one bill at a time for being sequentially relayed by a bill transport mechanism 16, according to a precisely predetermined transport path, between a pair of scanheads 18a, 18b where the currency denomination of the bill is scanned and identified. In the preferred embodiment depicted, each scanhead 18a, 18b is an optical scanhead that scans for characteristic information from a scanned bill 17 which is used to identify the denomination of the bill. The scanned bill 17 is then transported to an output receptacle or bill stacking station 20 where bills so processed are stacked for subsequent removal.

Each optical scanhead 18a, 18b preferably comprises a pair of light sources 22 directing light onto the bill transport path so as to illuminate a substantially rectangular light strip 24 upon a currency bill 17 positioned on the transport path adjacent the scanhead 18. Light reflected off the illuminated strip 24 is sensed by a photodetector 26 positioned between the two light sources. The analog output of the photodetector 26 is converted into a digital signal by means of an analog-to-digital (ADC) convertor unit 28 whose output is fed as a digital input to a central processing unit (CPU) 30.

While scanheads 18a, 18b in the preferred embodiment of FIG. 2 are optical scanheads, it should be understood that they may be designed to detect a variety of characteristic information from currency bills. Additionally, the scanheads may employ a variety of detection means such as magnetic, optical, electrical conductivity, and capacitive sensors. Use of such sensors is discussed in more detail U.S. patent application Ser. No. 08/219,093 filed on Mar. 29, 1994 for a "Currency Discriminator and Authenticator" and incorporated herein by reference.

Referring again to the preferred embodiment depicted in FIG. 2, the bill transport path is defined in such a way that the transport mechanism 16 moves currency bills with the narrow dimension of the bills being parallel to the transport path and the scan direction. Alternatively, the system 10 may be designed to scan bills along their long dimension or along a skewed dimension. As a bill 17 traverses the scanheads 18a, 18b, the coherent light strip 24 effectively scans the bill across the narrow dimension of the bill. In the preferred embodiment depicted, the transport path is so arranged that a currency bill 17 is scanned across a central section of the bill along its narrow dimension, as shown in FIG. 2. Each scanhead functions to detect light reflected from the bill as it moves across the illuminated light strip 24 and to provide an analog representation of the variation in reflected light, which, in turn, represents the variation in the dark and light content of the printed pattern or indicia on the surface of the bill. This variation in light reflected from the narrow dimension scanning of the bills serves as a measure for distinguishing, with a high degree of confidence, among a plurality of currency denominations which the system is programmed to handle.

A series of such detected reflectance signals are obtained across the narrow dimension of the bill, or across a selected segment thereof, and the resulting analog signals are digitized under control of the CPU 30 to yield a fixed number of digital reflectance data samples. The data samples are then subjected to a normalizing routine for processing the sampled data for improved correlation and for smoothing out variations due to "contrast" fluctuations in the printed pattern existing on the bill surface. The normalized reflectance data represents a characteristic pattern that is unique for a given bill denomination and provides sufficient distinguishing features among characteristic patterns for different currency denominations. This process is more fully explained in U.S. patent application Ser. No. 07/885,648, filed on May 19, 1992, now issued as U.S. Pat. No. 5,295,196 for a "Method and Apparatus for Currency Discrimination and Counting," which is incorporated herein by reference in its entirety.

In order to ensure strict correspondence between reflectance samples obtained by narrow dimension scanning of successive bills, the reflectance sampling process is preferably controlled through the CPU 30 by means of an optical encoder 32 which is linked to the bill transport mechanism 16 and precisely tracks the physical movement of the bill 17 between the scanheads 18a, 18b. More specifically, the optical encoder 32 is linked to the rotary motion of the drive motor which generates the movement imparted to the bill along the transport path. In addition, the mechanics of the feed mechanism (not shown, see U.S. Pat. No. 5,295,196 referred to above and pending U.S. application Ser. No. 08/340,031 filed on Nov. 14, 1994) ensure that positive contact is maintained between the bill and the transport path, particularly when the bill is being scanned by the scanheads. Under these conditions, the optical encoder 32 is capable of precisely tracking the movement of the bill 17 relative to the light strips 24 generated by the scanheads 18a, 18b by monitoring the rotary motion of the drive motor.

The outputs of the photodetectors 26 are monitored by the CPU 30 to initially detect the presence of the bill adjacent the scanheads and, subsequently, to detect the starting point of the printed pattern on the bill, as represented by the thin borderline 17a which typically encloses the printed indicia on currency bills. Once the borderline 17a has been detected, the optical encoder 32 is used to control the timing and number of reflectance samples that are obtained from the outputs of the photodetectors 26 as the bill 17 moves across the scanheads.

The detection of the borderline 17a constitutes an important step and realizes improved discrimination efficiency in systems designed to accommodate U.S. currency since the borderline 17a serves as an absolute reference point for initiation of sampling. If the edge of a bill were to be used as a reference point, relative displacement of sampling points can occur because of the random manner in which the distance from the edge to the borderline 17a varies from bill to bill due to the relatively large range of tolerances permitted during printing and cutting of currency bills. As a result, it becomes difficult to establish direct correspondence between sample points in successive bill scans and the discrimination efficiency is adversely affected. Accordingly, the modified pattern generation method of the present invention (to be discussed below) is especially important in discrimination systems designed to accommodate bills other than U.S. currency because many non-U.S. bills lack a borderline around the printed indicia on their bills. Likewise, the modified pattern generation method of the present invention is especially important in discrimination systems designed to accommodate bills other than U.S. currency because the printed indicia of many non-U.S. bills lack sharply defined edges which in turns inhibits using the edge of the printed indicia of a bill as a trigger for the initiation of the scanning process and instead promotes reliance on using the edge of the bill itself as the trigger for the initiation of the scanning process.

The use of the optical encoder 32 for controlling the sampling process relative to the physical movement of a bill 17 across the scanheads 18a, 18b is also advantageous in that the encoder 32 can be used to provide a predetermined delay following detection of the borderline 17a prior to initiation of samples. The encoder delay can be adjusted in such a way that the bill 17 is scanned only across those segments which contain the most distinguishable printed indicia relative to the different currency denominations.

In the case of U.S. currency, for instance, it has been determined that the central, approximately two-inch (approximately 5 cm) portion of currency bills, as scanned across the central section of the narrow dimension of the bill, provides sufficient data for distinguishing among the various U.S. currency denominations on the basis of the correlation technique disclosed in U.S. Pat. No. 5,295,196 referred to above. Accordingly, the optical encoder can be used to control the scanning process so that reflectance samples are taken for a set period of time and only after a certain period of time has elapsed after the borderline 17a is detected, thereby restricting the scanning to the desired central portion of the narrow dimension of the bill.

Figure 3:
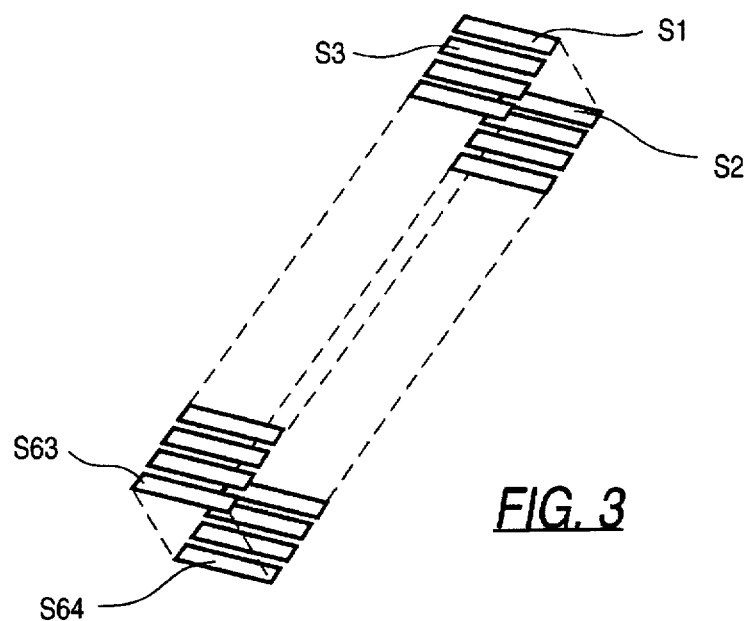
FIG. 3 is a diagrammatic perspective illustration of the successive areas scanned during the traversing movement of a single bill across an optical sensor according to a preferred embodiment of the present invention.
Figure 4:
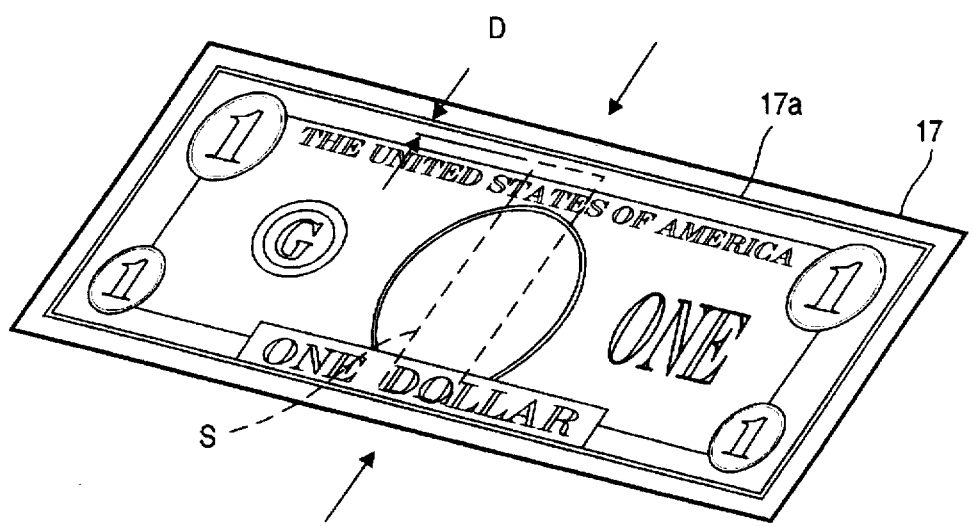
FIG. 4 is a perspective view of a bill and a preferred area to be optically scanned on the bill.
Figure 5:
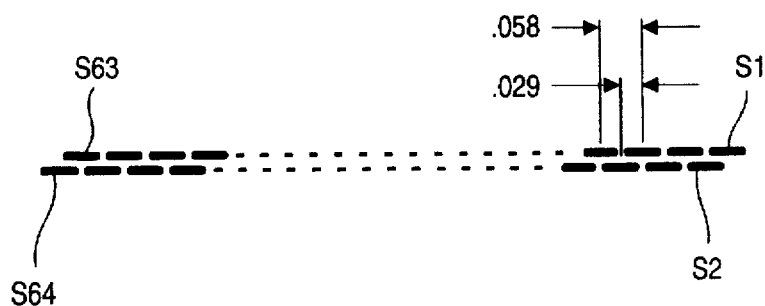
FIG. 5 is a diagrammatic side elevation view of the scan area to be optically scanned on a bill according to a preferred embodiment of the present invention.

FIGS. 3–5 illustrate the scanning process in more detail. Referring to FIG. 4, as a bill 17 is advanced in a direction parallel to the narrow edges of the bill, scanning via a slit in the scanhead 18a or 18b is effected along a segment S of the central portion of the bill 17. This segment S begins a fixed distance D inboard of the borderline 17a. As the bill 17 traverses the scanhead, a strip s of the segment S is always illuminated, and the photodetector 26 produces a continuous output signal which is proportional to the intensity of the light reflected from the illuminated strip s at any given instant. This output is sampled at intervals controlled by the encoder, so that the sampling intervals are precisely synchronized with the movement of the bill across the scanhead.

As illustrated in FIGS. 3 and 5, it is preferred that the sampling intervals be selected so that the strips s that are illuminated for successive samples overlap one another. The odd-numbered and even-numbered sample strips have been separated in FIGS. 3 and 5 to more clearly illustrate this overlap. For example, the first and second strips s1 and s2 overlap each other, the second and third strips s2 and s3 overlap each other, and so on. Each adjacent pair of strips overlap each other. In the illustrative example, this is accomplished by sampling strips that are 0.050 inch (0.127 cm) wide at 0.029 inch (0.074 cm) intervals, along a segment S that is 1.83 inch (4.65 cm) long (64 samples).

The optical sensing and correlation technique is based upon using the above process to generate a series of stored intensity signal patterns using genuine bills for each denomination of currency that is to be detected. According to a preferred embodiment, two or four sets of master intensity signal samples are generated and stored within the system memory, preferably in the form of an EPROM 34 (see FIG. 2), for each detectable currency denomination. In the case of U.S. currency, the sets of master intensity signal samples for each bill are generated from optical scans, performed on the green surface of the bill and taken along both the "forward" and "reverse" directions relative to the pattern printed on the bill. Alternatively, the optical scanning may be performed on the black side of U.S. currency bills or on either surface of foreign bills. Additionally, the optical scanning may be performed on both sides of a bill, for example, by placing a scanhead on each side of the bill transport path as described in more detail in co-pending U.S. patent application Ser. No. 08/207,592 filed Mar. 8, 1994, for a "Method and Apparatus for Currency Discrimination."

In adapting this technique to U.S. currency, for example, sets of stored intensity signal samples are generated and stored for seven different denominations of U.S. currency, i.e., $1, $2, $5, $10, $20, $50 and $100. For bills which produce significant pattern changes when shifted slightly to the left or right, such as the $10 bill in U.S. currency, it is preferred to store two patterns for each of the "forward" and "reverse" directions, each pair of patterns for the same direction represent two scan areas that are slightly displaced from each other along the long dimension of the bill. Accordingly, a set of 16 different master characteristic patterns are stored within the EPROM for subsequent correlation purposes (four master patterns for the $10 bill and two master patterns for each of the other denominations). The generation of the master patterns is discussed in more detail in co-pending U.S. patent application Ser. No. 08/243,807 filed May 16, 1994, for a "Method and Apparatus for Currency Discrimination." Once the master patterns have been stored, the pattern generated by scanning a bill under test is compared by the CPU 30 with each of the 16 master patterns of stored intensity signal samples to generate, for each comparison, a correlation number representing the extent of correlation, i.e., similarity between corresponding ones of the plurality of data samples, for the sets of data being compared.

The CPU 30 is programmed to identify the denomination of the scanned bill as corresponding to the set of stored intensity signal samples for which the correlation number resulting from pattern comparison is found to be the highest. In order to preclude the possibility of mischaracterizing the denomination of a scanned bill, as well as to reduce the possibility of spurious notes being identified as belonging to a valid denomination, a bi-level threshold of correlation is used as the basis for making a "positive" call. Such a method is disclosed in U.S. Pat. No. 5,295,196 referred to above and pending U.S. application Ser. No. 08/340,031 filed on Nov. 14, 1994. If a "positive" call can not be made for a scanned bill, an error signal is generated.

Using the above sensing and correlation approach, the CPU 30 is programmed to count the number of bills belonging to a particular currency denomination as part of a given set of bills that have been scanned for a given scan batch, and to determine the aggregate total of the currency amount represented by the bills scanned during a scan batch. The CPU 30 is also linked to an output unit 36 which is adapted to provide a display of the number of bills counted, the breakdown of the bills in terms of currency denomination, and the aggregate total of the currency value represented by counted bills. The output unit 36 can also be adapted to provide a print-out of the displayed information in a desired format.

Figure 6:
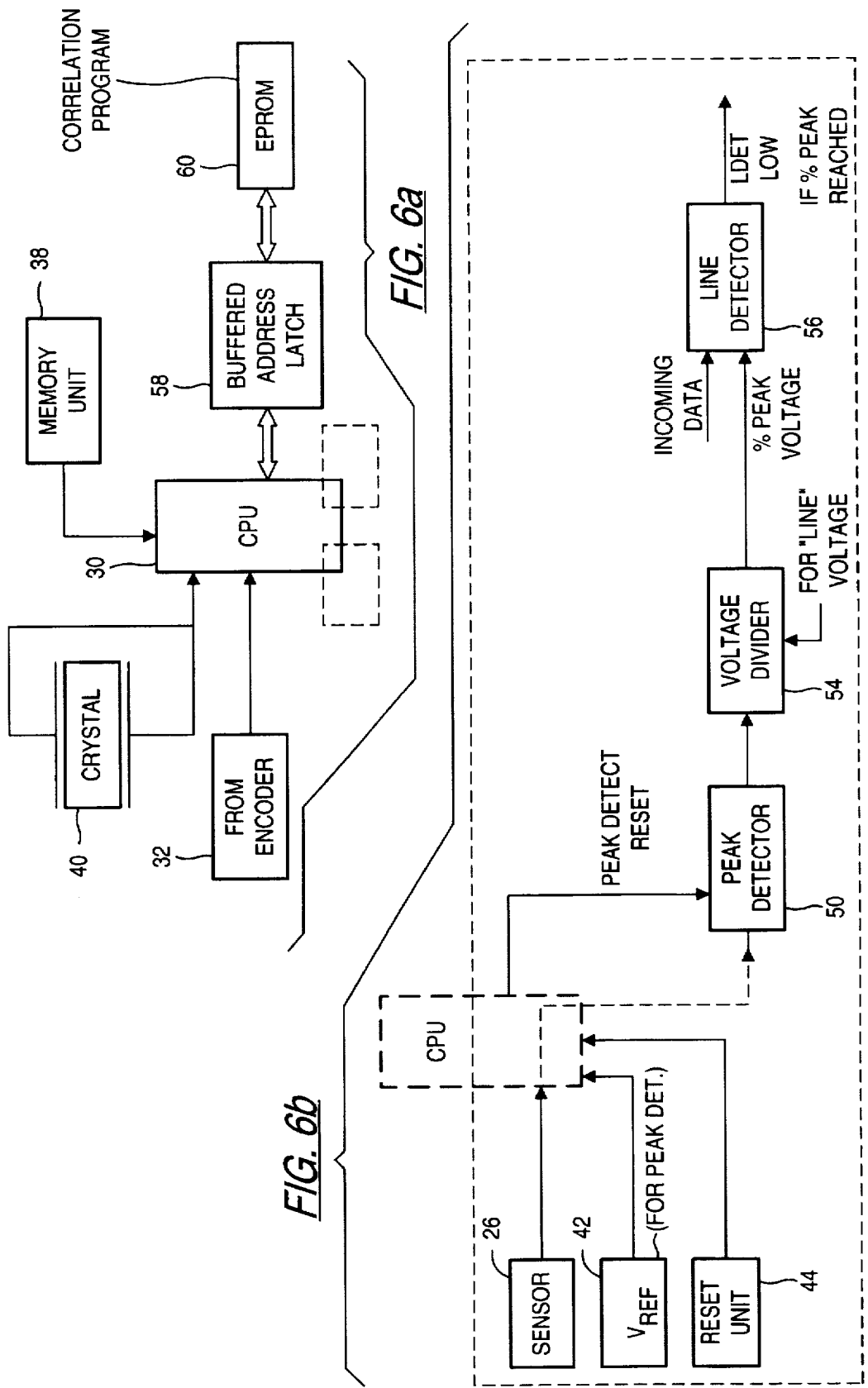
FIGS. 6a and 6b form a block diagram illustrating a preferred circuit arrangement for processing and correlating reflectance data according to the optical sensing and counting technique of this invention.

Referring now to FIGS. 6a and 6b, there is shown a representation, in block diagram form, of a preferred circuit arrangement for processing and correlating reflectance data according to the system of this invention. The CPU 30 accepts and processes a variety of input signals including those from the optical encoder 32, the sensor 26 and the erasable programmable read only memory (EPROM) 60. The EPROM 60 has stored within it the correlation program on the basis of which patterns are generated and test patterns compared with stored master programs in order to identify the denomination of test currency. A crystal 40 serves as the time base for the CPU 30, which is also provided with an external reference voltage $V_{REF}$ 42 on the basis of which peak detection of sensed reflectance data is performed.

The CPU 30 processes the output of the sensor 26 through a peak detector 50 which essentially functions to sample the sensor output voltage and hold the highest, i.e., peak, voltage value encountered after the detector has been enabled. For U.S. currency, the peak detector is also adapted to define a scaled voltage on the basis of which the printed borderline on the currency bills is detected. The output of the peak detector 50 is fed to a voltage divider 54 which lowers the peak voltage down to a scaled voltage $V_s$ representing a predefined percentage of this peak value. The voltage $V_s$ is based upon the percentage drop in output voltage of the peak detector as it reflects the transition from the "high" reflectance value resulting from the scanning of the unprinted edge portions of a currency bill to the relatively lower "gray" reflectance value resulting when the thin borderline is encountered. Preferably, the scaled voltage $V_s$ is set to be about 70–80 percent of the peak voltage.

The scaled voltage $V_s$ is supplied to a line detector 56 which is also provided with the incoming instantaneous output of the sensor 26. The line detector 56 compares the two voltages at its input side and generates a signal $L_{DET}$ which normally stays "low" and goes "high" when the edge of the bill is scanned. The signal $L_{DET}$ goes "low" when the incoming sensor output reaches the pre-defined percentage of the peak output up to that point, as represented by the voltage $V_s$. Thus, when the signal $L_{DET}$ goes "low", it is an indication that the borderline of the bill pattern has been detected. At this point, the CPU 30 initiates the actual reflectance sampling under control of the encoder 32 and the desired fixed number of reflectance samples are obtained as the currency bill moves across the illuminated light strip and is scanned along the central section of its narrow dimension.

When master characteristic patterns are being generated, the reflectance samples resulting from the scanning of one or more genuine bills for each denomination are loaded into corresponding designated sections within a system memory 60, which is preferably an EPROM. During currency discrimination, the reflectance values resulting from the scanning of a test bill are sequentially compared, under control of the correlation program stored within the EPROM 60, with the corresponding master characteristic patterns stored within the EPROM 60. A pattern averaging procedure for scanning bills and generating characteristic patterns is described in co-pending U.S. patent application Ser. No. 08/243,807, filed on May 16, 1994 and entitled "Method and Apparatus for Currency Discrimination," which is incorporated herein by reference.

In addition to the optical scanheads, the bill-scanning system preferably includes a magnetic scanhead. A variety of currency characteristics can be measured using magnetic scanning. These include detection of patterns of changes in magnetic flux (U.S. Pat. No. 3,280,974), patterns of vertical grid lines in the portrait area of bills (U.S. Pat. No. 3,870,629), the presence of a security thread (U.S. Pat. No. 5,151,607), total amount of magnetizable material of a bill (U.S. Pat. No. 4,617,458), patterns from sensing the strength of magnetic fields along a bill (U.S. Pat. No. 4,593,184), and other patterns and counts from scanning different portions of the bill such as the area in which the denomination is written out (U.S. Pat. No. 4,356,473).

The optical sensing and correlation technique described above and in U.S. Pat. No. 5,295,196 and pending U.S. application Ser. No. 08/340,031 filed on Nov. 14, 1994 permits identification of pre-programmed currency denominations with a high degree of accuracy and is based upon a relatively low processing time for digitizing sampled reflectance values and comparing them to the master characteristic patterns. The approach is used to scan currency bills, normalize the scanned data, and generate master patterns in such a way that bill scans during operation have a direct correspondence between compared sample points in portions of the bills which possess the most distinguishable printed indicia. A relatively low number of reflectance samples is required in order to be able to adequately distinguish among several currency denominations.

Figure 7:
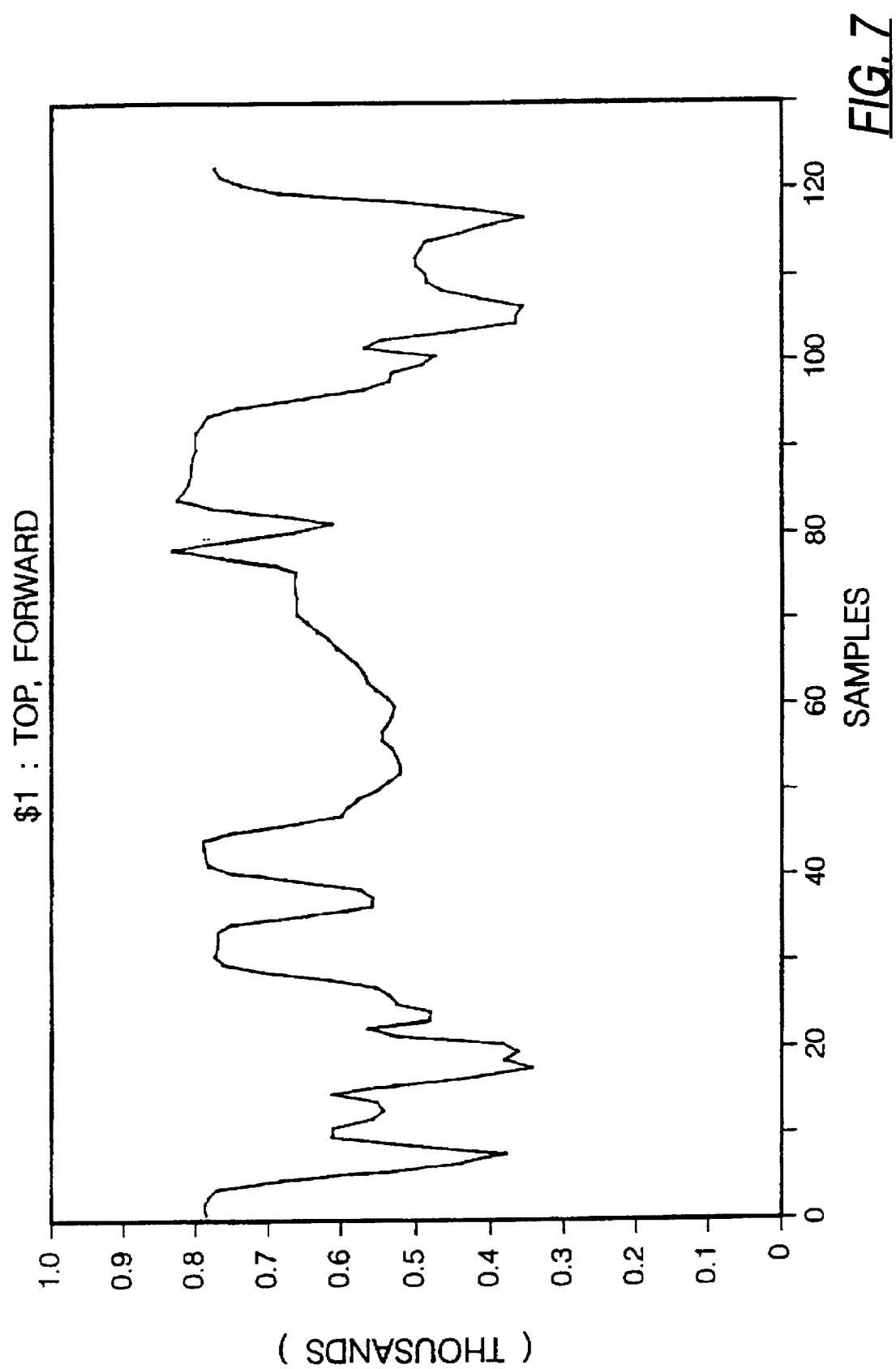
FIG. 7 is a graphical illustration of representative characteristic patterns generated by narrow dimension optical scanning of a $1 currency bill in the forward direction.
Figure 8:
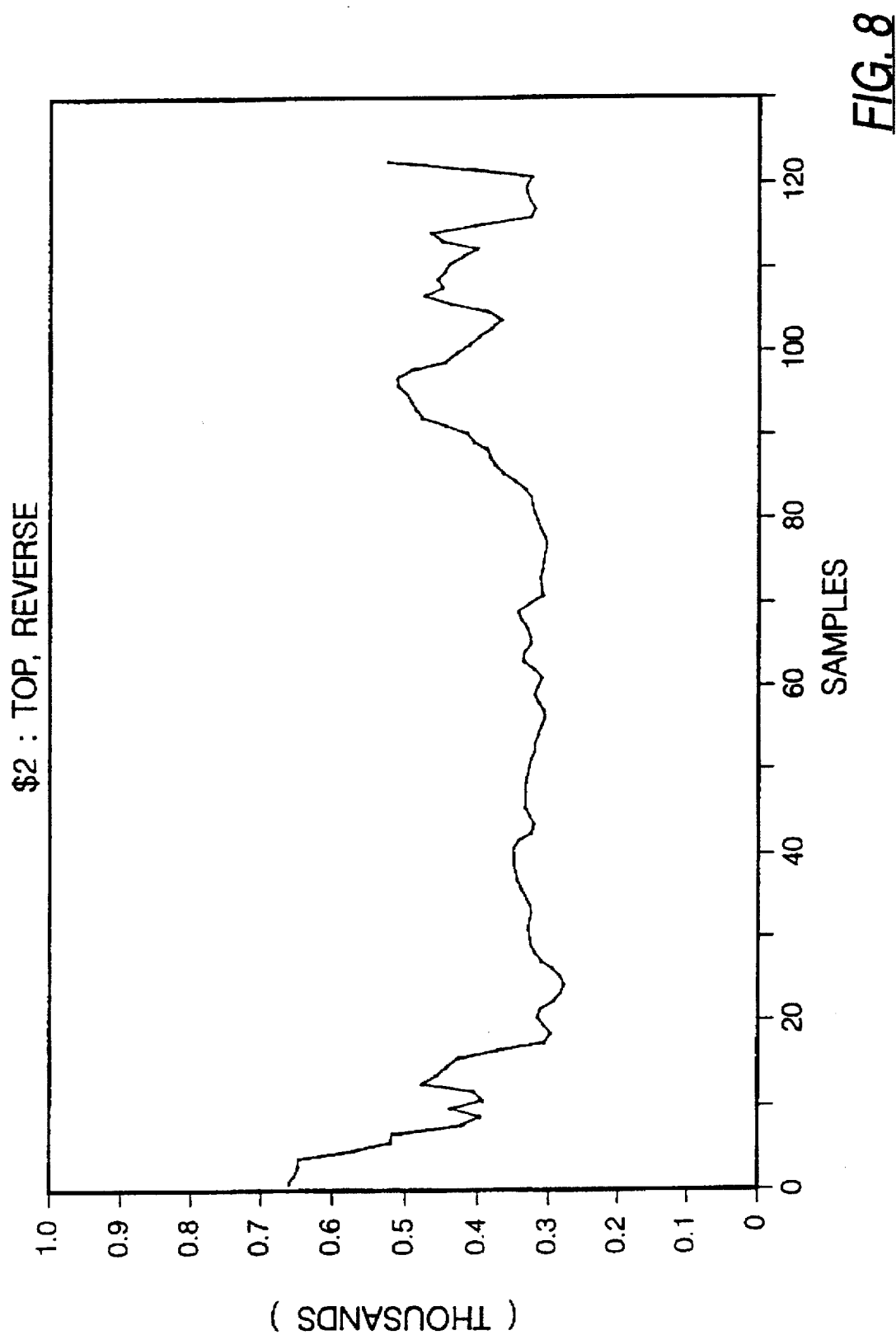
FIG. 8 is a graphical illustration of representative characteristic patterns generated by narrow dimension optical scanning of a $2 currency bill in the reverse direction.
Figure 9:
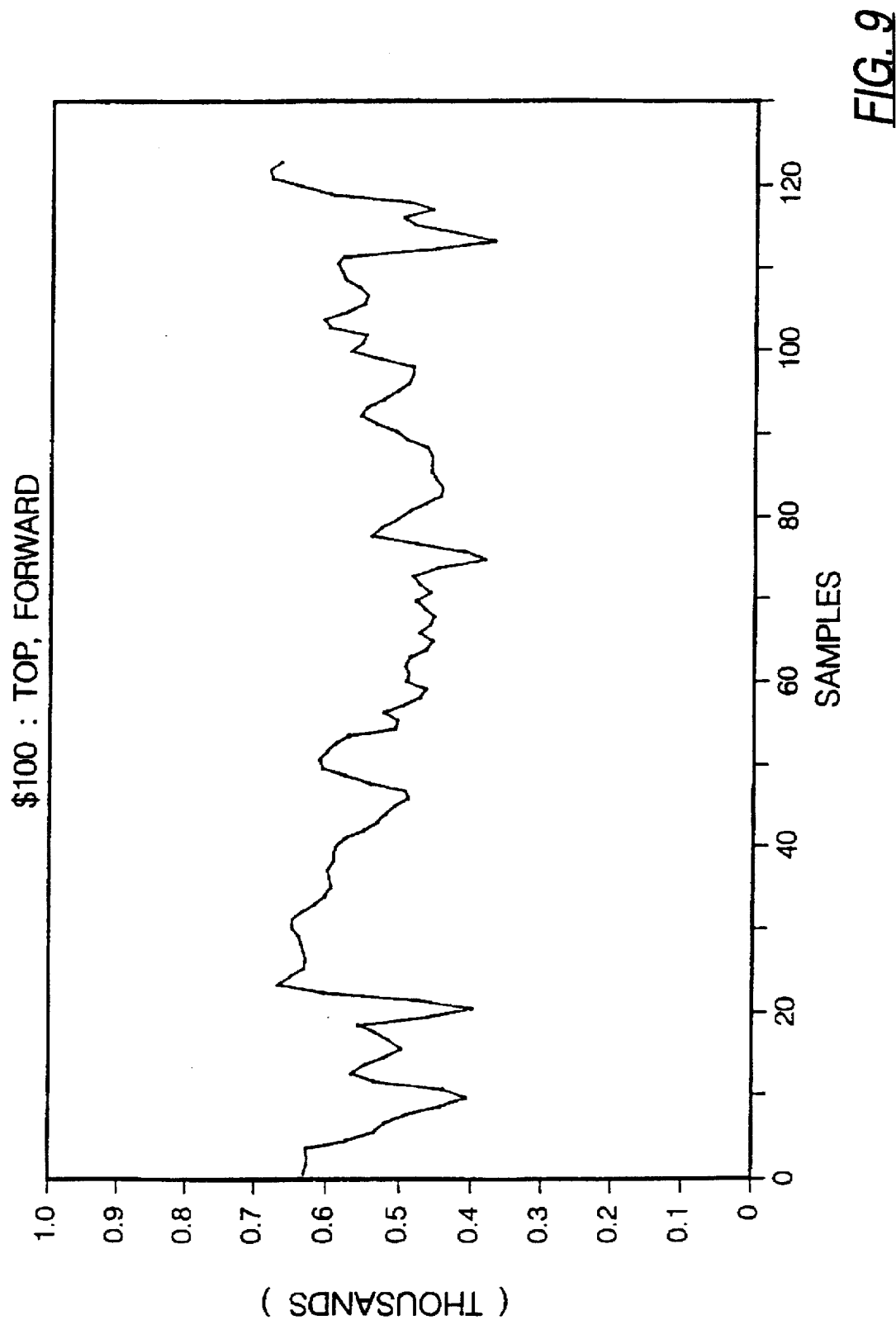
FIG. 9 is a graphical illustration of representative characteristic patterns generated by narrow dimension optical scanning of a $100 currency bill in the forward direction.

Examples of characteristic patterns obtained by optically scanning several U.S. currency bills as discussed above are illustrated in FIGS. 7–9. More specifically, FIGS. 7–9 show three test patterns generated, respectively, for the forward scanning of a $1 bill along its green side, the reverse scanning of a $2 bill on its green side, and the forward scanning of a $100 bill on its green side. It should be noted that, for purposes of clarity the test patterns in FIGS. 7–9 were generated by using 128 reflectance samples per bill scan, as opposed to the preferred use of only 64 samples. The marked difference existing among corresponding samples for these three test patterns is indicative of the high degree of confidence with which currency denominations may be called using the foregoing optical sensing and correlation procedure.

In currency discrimination systems in which discrimination is based on the comparison of a pattern obtained from scanning a subject bill to stored master patterns corresponding to various denominations, the patterns which are compared to each other significantly influence the performance characteristics of a discrimination system. For example, in the system described in U.S. Pat. No. 5,295,196, the correlation procedure and the accuracy with which a denomination is identified directly relates to the degree of correspondence between reflectance samples on the test pattern and corresponding samples on the stored master patterns. In accordance with method described above, the identity of a bill under test is determined by comparing a scanned pattern generated by scanning the bill under test with one or more master patterns associated with genuine bills. If the scanned pattern sufficiently correlates to one of the master pattern, the identity of the bill may be called. The process of identifying a bill under test may be subjected to a bi-level threshold test as described in more detail in U.S. Pat. No. 5,295,196 and pending U.S. application Ser. No. 08/340,031 filed on Nov. 14, 1994.

However, the degree of correlation between a scanned and a master pattern may be negatively impacted if the two patterns are not properly aligned with each other. Such misalignment between patterns may in turn negatively impact upon the performance of a currency identification system. Misalignment between patterns may result from a number of factors. For example, if a system is designed so that the scanning process is initiated in response to the detection of the thin borderline surrounding U.S. currency or the detection of some other printed indicia such as the edge of printed indicia on a bill, stray marks may cause initiation of the scanning process at an improper time. This is especially true for stray marks in the area between the edge of a bill and the edge of the printed indicia on the bill. Such stray marks may cause the scanning process to be initiated too soon, resulting in a scanned pattern which leads a corresponding master pattern. Alternatively, where the detection of the edge of a bill is used to trigger the scanning process, misalignment between patterns may result from variances between the location of printed indicia on a bill relative to the edges of a bill. Such variances may result from tolerances permitted during the printing and/or cutting processes in the manufacture of currency. For example, it has been found that location of the leading edge of printed indicia on Canadian currency relative to the edge of Canadian currency may vary up to approximately 0.2 inches (approximately 0.5 cm).

According to a preferred embodiment of the present invention, the problems associated with misaligned patterns are overcome by employing an improved method of generating multiple scanned and/or master patterns and comparing the multiple scanned and master patterns with each other. Briefly, a preferred embodiment of the improved pattern generation method involves removing data samples from one end of a pattern to be modified and adding data values on the opposite end equal to the dam values contained in the corresponding sequence positions of the pattern to which the modified pattern is to be compared. This process may be repeated, up to a determined number of times, until a sufficiently high correlation is obtained between the two patterns so as to permit the identity of a bill under test to be called.

A preferred embodiment of the present invention can be further understood by considering Table 1. Table 1 contains data samples generated by scanning the narrow dimension of Canadian $2 bills along a segment positioned about the center of the bill on the side opposite the portrait side. More specifically, the second column of Table 1 represents a scanned pattern generated by scanning a test Canadian $2 bill. The scanned pattern comprises 64 data samples arranged in a sequence. Each data sample has a sequence position, 1–64, associated therewith. The fifth column represents a master pattern associated with a Canadian $2 bill. The master pattern likewise comprises a sequence of 64 data samples. The third and fourth columns represent the scanned pattern after it has been modified in the forward direction one and two times, respectively. In the embodiment depicted in Table 1, one data sample is removed from the beginning of the preceding pattern during each modification.

TABLE 1

| Sequence Position | Scanned Pattern | Scanned Pattern Modified Once | Scanned Pattern Modified Twice | Master Pattern |
|---|---|---|---|---|
| 1 | 93 | 50 | −21 | 161 |
| 2 | 50 | −21 | 50 | 100 |
| 3 | −21 | 50 | 93 | 171 |
| 4 | 50 | 93 | 65 | 191 |
| 5 | 93 | 65 | 22 | 252 |
| 6 | 65 | 22 | 79 | 403 |
| 7 | 22 | 79 | 136 | 312 |
| 8 | 79 | 136 | 193 | 434 |
| 9 | 136 | 193 | 278 | 90 |
| 10 | 193 | 278 | 164 | 0 |
| 11 | 278 | 164 | 136 | 20 |
| 12 | 164 | 136 | 278 | 444 |
| . | . | . | . | . |
| . | . | . | . | . |
| . | . | . | . | . |
| 52 | 490 | −518 | −447 | −1090 |
| 53 | −518 | −447 | −646 | −767 |
| 54 | 447 | −646 | −348 | −575 |
| 55 | −646 | −348 | −92 | −514 |
| 56 | −348 | −92 | −63 | −545 |
| 57 | −92 | −63 | −205 | −40 |
| 58 | −63 | −205 | 605 | 1665 |
| 59 | −205 | 605 | 1756 | 1705 |
| 60 | 605 | 1756 | 1401 | 1685 |
| 61 | 1756 | 1401 | 1671 | 2160 |
| 62 | 1401 | 1671 | 2154 | 2271 |

TABLE 1-continued

| Sequence Position | Scanned Pattern | Scanned Pattern Modified Once | Scanned Pattern Modified Twice | Master Pattern |
|---|---|---|---|---|
| 63 | 1671 | 2154 | *2240 | 2240 |
| 64 | 2154 | *2210 | *2210 | 2210 |

The modified pattern represented in the third column is generated by adding an additional data value to the end of the original scanned pattern sequence which effectively removes the first data sample of the original pattern, e.g., 93, from the modified pattern. The added data value in the last sequence position, 64, is set equal to the data value contained in the 64th sequence position of the master pattern, e.g., 2210. This copying of the 64th data sample is indicated by an asterisk in the third column. The second modified pattern represented in the fourth column is generated by adding two additional data values to the end of the original scanned pattern which effectively removes the first two data samples of the original scanned, e.g., 93 and 50, from the second modified pattern. The last two sequence positions, 63 and 64, are filled with the data value contained in the 63rd and 64th sequence positions of the master pattern, e.g., 2240 and 2210, respectively. The copying of the 63rd and 64th data samples is indicated by asterisks in the fourth column.

In the example of Table 1, the printed area of the bill under test from which the scanned pattern was generated was farther away from the leading edge of the bill than was the printed area of the bill from which the master pattern was generated. As a result, the scanned pattern trailed the master pattern. The preferred embodiment of the pattern generation method described in conjunction with Table 1 compensates for the variance of the distance between the edge of the bill and the edge of the printed indicia by modifying the scanned pattern in the forward direction. As a result of the modification method employed, the correlation between the original and modified versions of the scanned pattern and the master pattern increased from 705 for the original, unmodified scanned pattern to 855 for the first modified pattern and to 988 for the second modified pattern. Accordingly, the bill under test which would otherwise have been rejected may now be properly called as a genuine $2 Canadian bill through the employment of the pattern generation method discussed above.

Figure 10A:
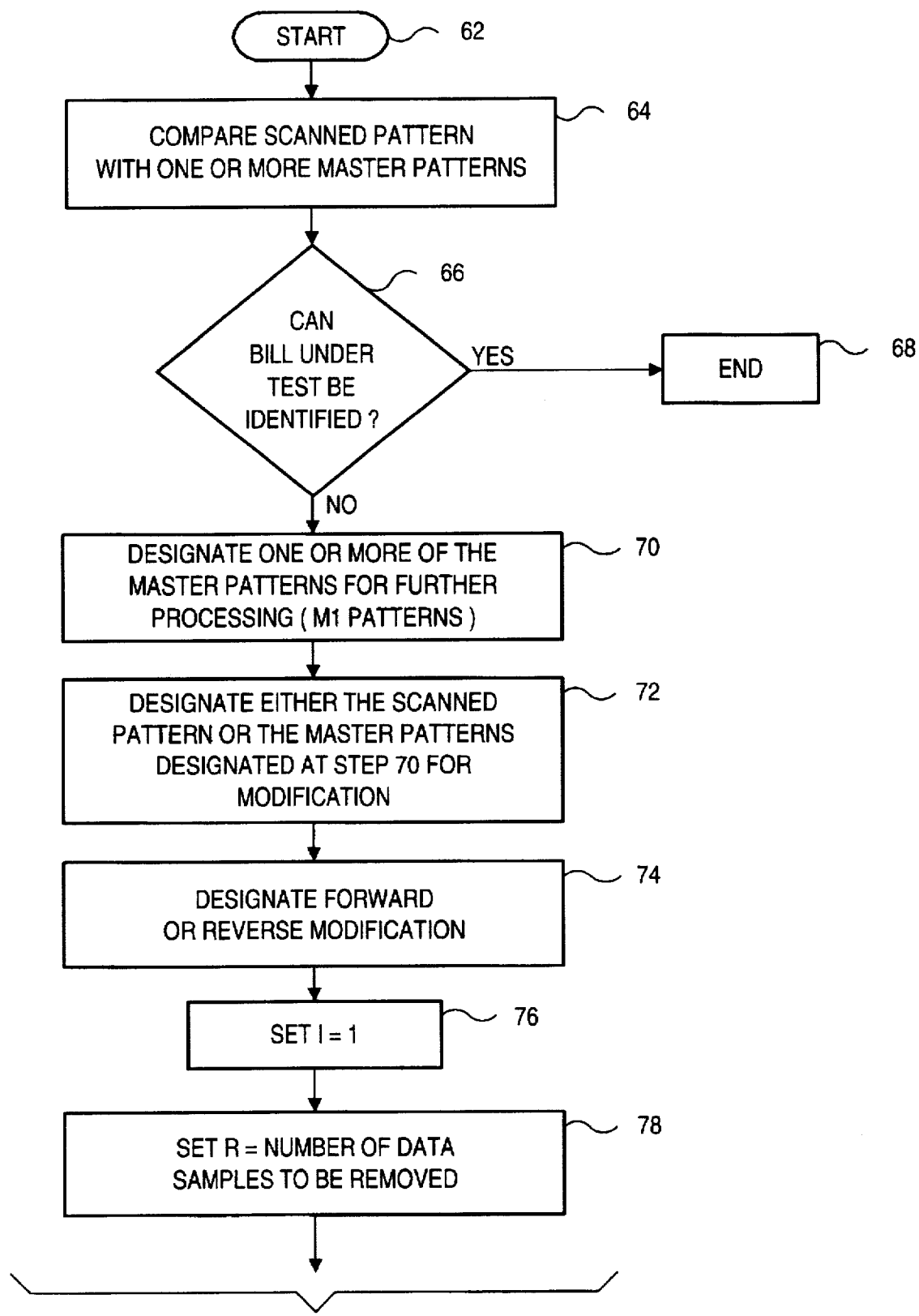
FIGS. 10a–10c are a flowchart illustrating a preferred embodiment of a modified pattern generation method according to the present invention.
Figure 10B:
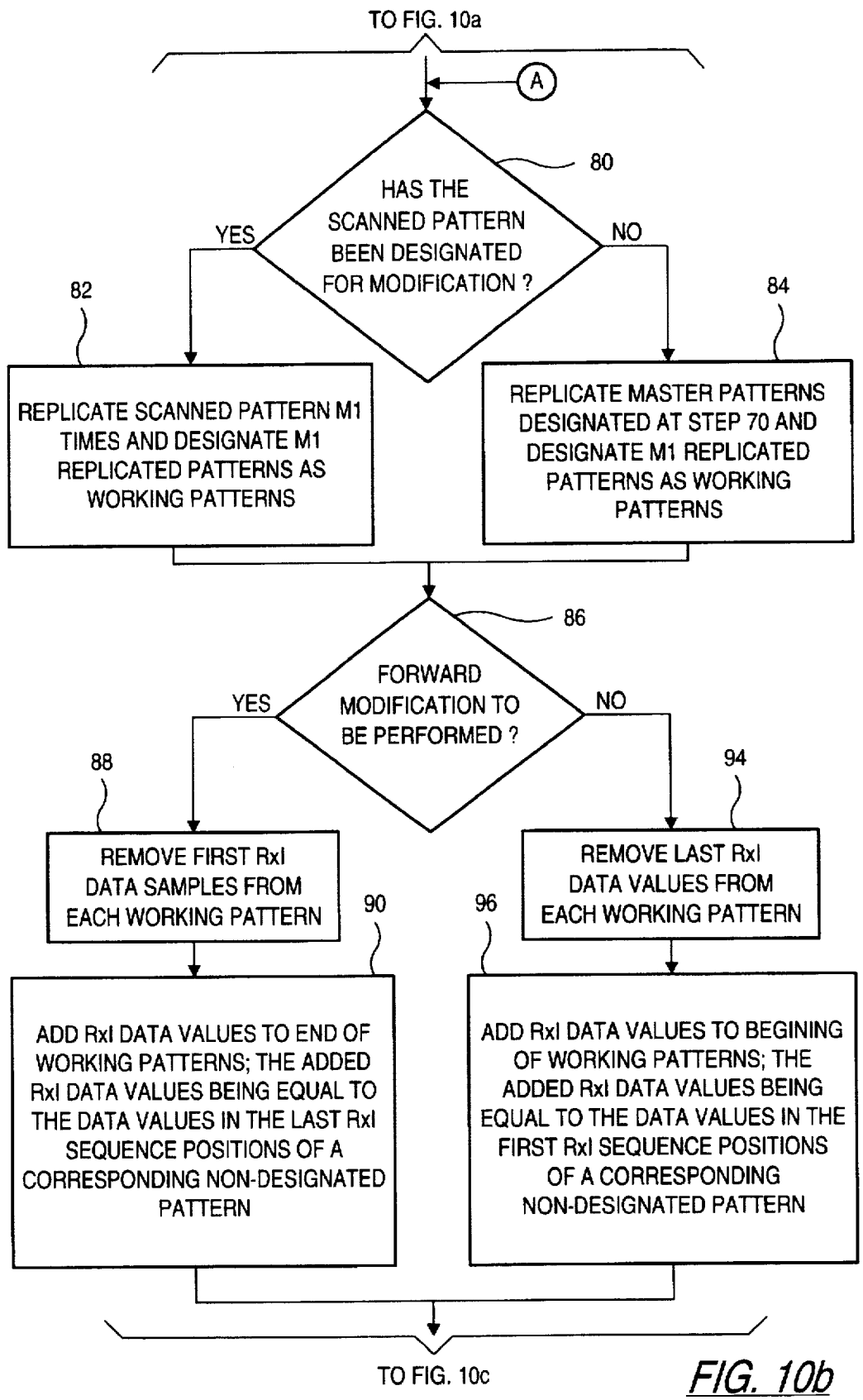
Figure 10C:
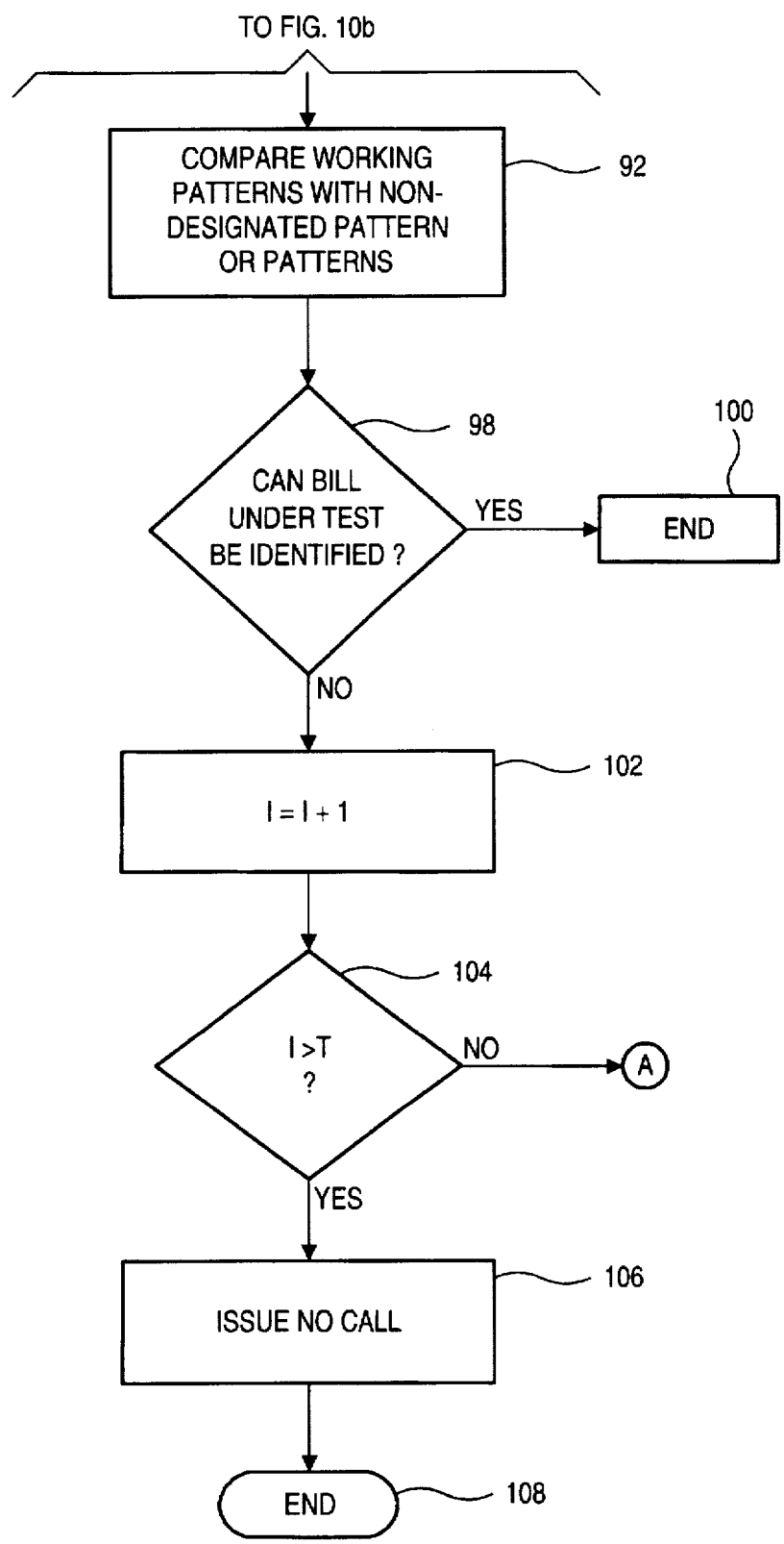

Another preferred embodiment of the present invention can be understood with reference to the flowchart of FIGS. 10a–10c. The process of FIGS. 10a–10c involves a method of identifying a bill under test by comparing a scanned pattern retrieved from a bill under test with one or more master patterns associated with one or more genuine bills. After the process begins at step 62, the scanned pattern is compared with one or more master patterns associated with genuine bills (step 64). At step 66 it is determined whether the bill under test can be identified based on the comparison at step 64. This may be accomplished by evaluating the correlation between the scanned pattern and each of the master patterns. If the bill can be identified, the process is ended at step 68. Otherwise, one or more of the master patterns are designated for further processing at step 70. For example, all of the master patterns may be designated for further processing. Alternatively, less than all of the master patterns may be designated based on a preliminary assessment about the identity of the bill under test. For example, only the master patterns which had the four highest correlation values with respect to the scanned pattern at step 64 might be chosen for further processing. In any case, the number of master patterns designated for further processing is M1.

At step 72, either the scanned pattern is designated for modification or the M1 master patterns designated at step 70 are designated for modification. In a preferred embodiment of the present invention, the scanned pattern is designated for modification and the master patterns remain unmodified. At step 74, it is designated whether forward modification or reverse modification is to be performed. This determination may be made, for example, by analyzing the beginning or ending data samples of the scanned pattern to determine whether the scanned pattern trails or leads the master patterns.

At step 76, the iteration counter, I, is set equal to one. The iteration counter is used to keep track of how many times the working patterns have been modified. Then at step 78, the number of incremental data samples, R, to be removed during each iteration is set. For example, in a preferred embodiment of the present invention, only one additional data sample is removed from each working pattern during each iteration in which case R is set equal to one.

At step 80, it is determined whether the scanned pattern has been designated for modification. If it has, then the scanned pattern is replicated M1 times and the M1 replicated patterns, one for each of the M1 master patterns, are designated as working patterns at step 82. If the scanned pattern has not been designated for modification, then the M1 master patterns have been so designated, and the M1 master patterns are replicated and designated as working patterns at step 84. Regardless of which pattern or patterns were designated for modification, at step 86, it is determined whether forward or reverse modification is to be performed on the working patterns.

If forward modification is to be performed, the first R×I data samples from each working pattern are removed at step 88. The first R×I data samples may either be explicitly removed from the working patterns or be removed as a result of adding additional data samples (step 90) to the end of the pattern and designating the beginning of the modified pattern to be the R×I+1 sequence position of the original pattern. As a result of the modification, the data sample which was in the 64th sequence position in the original working pattern will be in the 64–(R×I) sequence position. The added data values in the last R×I sequence positions of a working pattern are copied from the data samples in the last R×I sequence positions of a corresponding non-designated pattern at step 90. After the above described modification, the working patterns are compared with either respective ones of the non-designated patterns (scanned pattern modified/M1 master patterns not designated for modification) or the non-designated pattern (M1 master patterns designated for modification/scanned pattern not designated for modification) at step 92.

Alternatively, if reverse modification is to be performed, the last R×I data samples from each working pattern are removed at step 94. The last R×I data samples may either be explicitly removed from the working patterns or be removed as a result of adding additional data samples (step 96) to the beginning of the pattern and designating the beginning of the modified pattern to start with the added data samples. As a result of the modification, the data sample which was in the 1st sequence position in the original working pattern will be in the (R×I)+1 sequence position. The added data samples in first R×I sequence positions of a working pattern are copied from the data samples in the first R×I sequence positions of a corresponding non-designated pattern at step 96. After the above described modification, the working patterns are compared with either respective ones of the non-designated patterns (scanned pattern modified/M1 master patterns not designated for modification) or the non-designated pattern (M1 master patterns designated for modification/scanned pattern not designated for modification) at step 92.

For example, if the scanned pattern is designated for forward modification and four master patterns are designated for further processing, four working patterns are generated from the scanned pattern at step 82, one for each of the four master patterns. If R is set to two at step 78, during the first iteration the last two data samples from each of the M1 master patterns are copied and added to the end of the M1 working patterns so as to become the last two sequence positions of the M1 working patterns, one working pattern being associated with each of the M1 master patterns. As a result, after the first iteration, four different working patterns are generated with each working pattern corresponding to a modified version of the scanned pattern but with each having data values in its last two sequence positions copied from the last two sequence positions of a respective one of the M1 master patterns. After a second iteration, the last four sequence positions of each of the M1 master patterns are copied and added to the end of the M1 working patterns so as to become the last four sequence positions of a respective one of the M1 working patterns.

As another example, if four master patterns are designated for further processing and the four designated master patterns are designated for forward modification, four working patterns are generated at step 84, one from each of the four designated master patterns. If R is set to two at step 78, during the first iteration the last two data samples of the scanned pattern are copied and added to the end of the M1 working patterns so as to become the last two sequence positions of the M1 working patterns, one working pattern being associated with each of the M1 master patterns. As a result, after the first iteration, four different working patterns are generated with each working pattern corresponding to a modified version of a corresponding master pattern but with each having data values in its last two sequence position copied from the last two sequence positions of the scanned pattern. After a second iteration, the last four sequence positions of the scanned pattern are copied and added to the end of the M1 working patterns so as to become the last four sequence positions of the M1 working patterns.

After the comparison at step 92, it is determined whether the bill under test can be identified at step 98. If the bill can be identified the process is ended at step 100. Otherwise, the iteration counter, I, is incremented by one (step 102) and the incremented iteration counter is compared to a maximum iteration number, T (step 104). If the iteration counter, I, is greater than the maximum iteration number, T, then a no call is issued (step 106), meaning that a match sufficient to identify the bill under test was not obtained, and the process is ended (step 108). Otherwise, if the iteration is not greater than the maximum iteration number, the modification process is repeated beginning with step 80.

The flowchart of FIGS. 10a-10c is intended to illustrate one preferred embodiment of the present invention. However, it is recognized that there are numerous ways in which the steps of the flowchart of FIGS. 10a-10c may be rearranged or altered and yet still result in the comparison of the same patterns as would be compared if the steps of FIGS. 10a-10c were followed exactly. For example, instead of generating multiple working patterns, a single working pattern may be generated and the leading or trailing sequence positions successively altered before comparisons to corresponding non-designated patterns. Likewise, instead of generating multiple modified patterns directly from unmodified patterns, multiple modified patterns may be generated from the preceding modified patterns. For example, instead of generating a twice forward modified scanned pattern by removing the first two data samples from the original scanned pattern and copying the last 2R sequence positions of a corresponding master pattern and adding these data values to the end of the original scanned pattern, the first data sample of the single forward modified scanned pattern may be removed and one data sample added to the end of the single modified scanned pattern and then the data samples in the last two sequence positions may be set equal to the data samples in the last 2R sequence positions of a corresponding master pattern.

In an alternate preferred embodiment of the present invention, instead of copying data values from a scanned pattern into corresponding sequence positions of modified master patterns, leading or trailing sequence positions of modified master patterns are filled with zeros.

In an alternate preferred embodiment of the present invention, modified master patterns are stored, for example in EPROM 60 of FIG. 6a, before a bill under test is scanned. In such an embodiment, a scanned pattern retrieved from a bill under test is compared to the modified master patterns stored in memory. Modified master patterns are generated by modifying a corresponding master pattern in either the forward or backward direction, or both, and filling in any trailing or leading sequence positions with zeros. An advantage of such a preferred embodiment is that no modification needs to be performed during the normal operation of an identification device incorporating such an embodiment.

Figure 11:
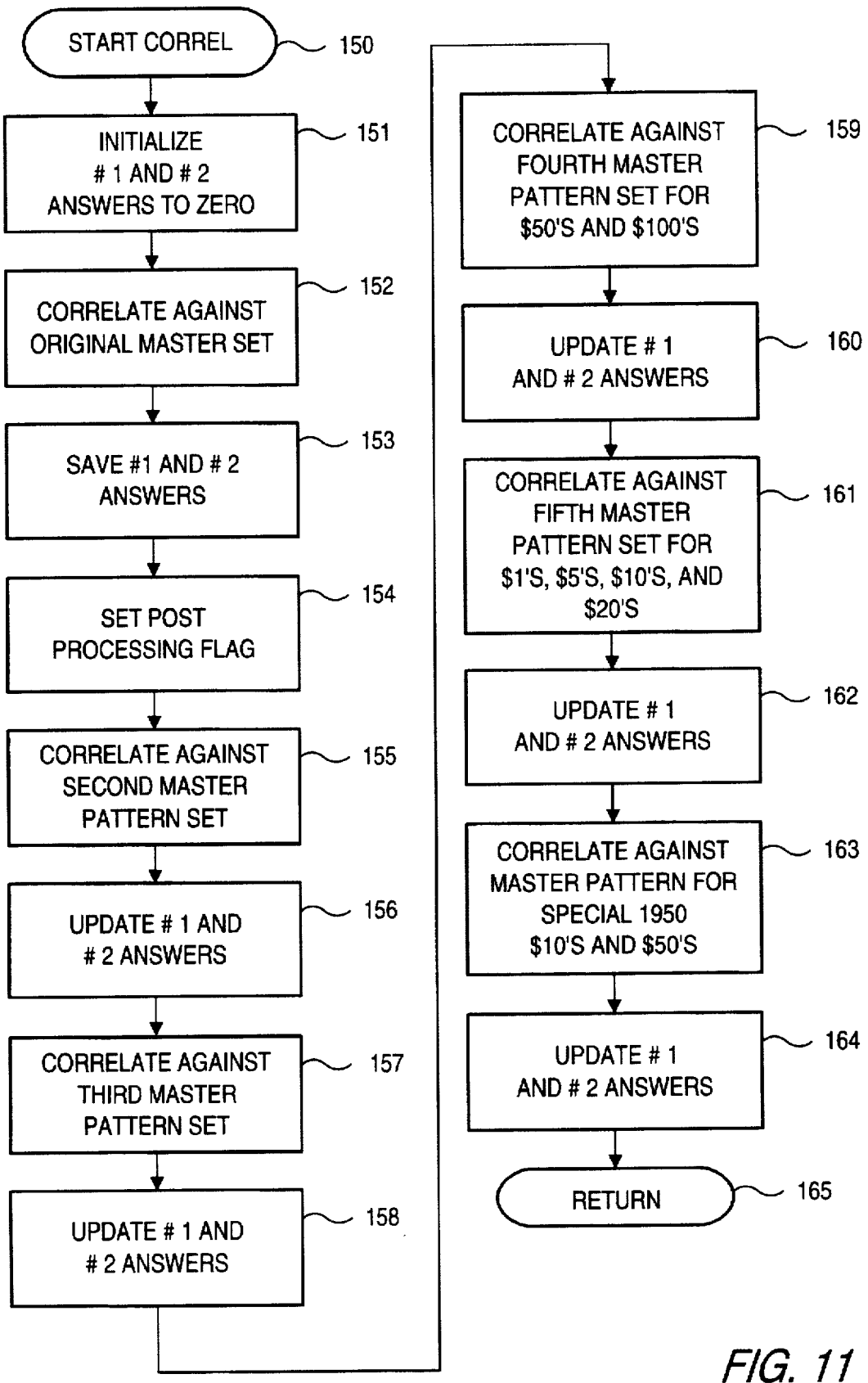
FIG. 11 is a flow chart illustrating the sequential procedure involved in the execution of multiple correlations of the scan data from a single bill.

An example of a procedure involved in comparing test patterns to master patterns is illustrated at FIG. 11 which shows the routine as starting at step 150. At step 151, the best and second best correlation results (referred to in FIG. 11 as the "#1 and #2 answers") are initialized to zero and, at step 152, the test pattern is compared with each of the sixteen original master patterns stored in the memory. At step 153, the calls corresponding to the two highest correlation numbers obtained up to that point are determined and saved. At step 154, a post-processing flag is set. At step 155 the test pattern is compared with each of a second set of 16 master patterns stored in the memory. This second set of master patterns is the same as the 16 original master patterns except that the last sample is dropped and a zero is inserted in front of the first sample. If any of the resulting correlation numbers is higher than the two highest numbers previously saved, the #1 and #2 answers are updated at step 156.

Steps 155 and 156 are repeated at steps 157 and 158, using a third set of master patterns formed by dropping the last two samples from each of the 16 original master patterns and inserting two zeros in front of the first sample. At steps 159 and 160 the same steps are repeated again, but using only $50 and $100 master patterns formed by dropping the last three samples from the original master patterns and adding three zeros in front of the first sample. Steps 161 and 162 repeat the procedure once again, using only $1, $5, $10 and $20 master patterns formed by dropping the 33rd sample whereby original samples 34–64 become samples 33–63 and inserting a 0 as the new last sample. Finally, steps 163 and 164 repeat the same procedure, using master patterns for $10 and $50 bills printed in 1950, which differ significantly from bills of the same denominations printed in later years. This routine then returns to the main program at step 165. The above multiple sets of master patterns may be pre-stored in EPROM 60.

While the present invention has been described with reference to one or more particular embodiments, those skilled in the art will recognize that many changes may be made thereto without departing from the spirit and scope of the present invention, which is set forth in the following claims.

I claim:

1. A method of generating modified scanned or master patterns for use in a discrimination system capable of identifying one or more currency bills comprising the steps of:

designating either a scanned pattern or a master pattern for modification, the pattern which is not designated being a non-designated pattern, each of said scanned and master patterns comprising a sequence of data values representing analog variations of characteristic information along a segment of a bill, each of said data values having an associated sequence position;

removing one or more data values from one end of the sequence of data values of said designated pattern; and inserting at the opposite end of the sequence of data values of said designated pattern a number of data values equal to the number of data values removed, said inserted data values being set equal to selected data values of said non-designated pattern, said selected data values having the same sequence positions in said non-designated pattern as said sequence positions of said designated pattern into which said selected data values are to be inserted.

2. The method of claim 1 wherein the sequences of data values of the scanned and master patterns each have a leading end and a trailing end, said leading end data values corresponding to the data values first retrieved from a bill and said trailing end data values corresponding to the data values last retrieved from a bill; wherein said removed data values are leading end data values; and wherein said selected data values are trailing end data values.

3. The method of claim 2 wherein said designated pattern is the scanned pattern.

4. The method of claim 3 wherein said scanned pattern is generated by optically scanning a bill.

5. The method of claim 3 wherein one data value is removed from said leading end of the scanned pattern.

6. The method of claim 3 wherein two data values are removed from said leading end of the scanned pattern.

7. The method of claim 1 wherein said scanned pattern is generated by optically scanning a bill.

8. The method of claim 1 wherein said designated pattern is the scanned pattern.

9. A method of generating modified scanned or master patterns for use in a discrimination system capable of identifying one or more currency bills comprising the steps of:

designating either a scanned pattern or a master pattern for modification in either a forward direction or a backward direction, the pattern which is not designated being a non-designated pattern, each of said scanned and master patterns comprising a sequence of data values representing analog variations of characteristic information along a segment of a bill, each pattern having a leading end and a trailing end, each of said data values having an associated sequence position; and inserting a predetermined number, R, of data values either at the trailing end of the sequence of data values of said designated pattern when said modification is performed in the forward direction or at the leading end of the sequence of data values of said designated pattern when said modification is performed in the backward direction, said inserted data values being set equal to either the last R data values of said non-designated pattern when said modification is performed in the forward direction or the first R data values of said non-designated pattern when said modification is performed in the backward direction, said modification effectively removing R data values from the leading or trailing end, respectively, of said designated pattern.

10. The method of claim 9 wherein said designated pattern is the scanned pattern.

11. The method of claim 9 wherein said scanned pattern is generated by optically scanning a bill.

12. The method of claim 9 wherein said predetermined number, R, is one.

13. An improved method of identifying one or more currency bills for use in identification systems which compare a scanned pattern with one or more master patterns comprising the steps of:

comparing an unmodified scanned pattern to one or more unmodified master patterns, said patterns comprising a sequence of data values representing analog variations of characteristic information along a segment of a bill, each of said data values having an associated sequence position, said unmodified scanned pattern being associated with a bill under test and said one or more unmodified master patterns being associated with one or more genuine bills;

identifying said bill under test associated with said unmodified scanned pattern based on said step of comparing where a sufficient match is obtained; and where the identity of said bill under test has not been determined as a result of said identifying step:

comparing either said unmodified scanned pattern with modified versions of one or more of said unmodified master patterns or a modified version of said unmodified scanned pattern with one or more of said unmodified master patterns; and identifying said bill under test based on said second comparing step where a sufficient match is obtained;

wherein said modified version of said unmodified scanned pattern comprises a sequence of data values; said modified scanned pattern having data values which are equal to said data values of said unmodified scanned pattern but which are offset in their sequence positions by a predetermined number, R; either said first R or last R data values of said unmodified scanned pattern not appearing in said modified scanned pattern; and either said last R or first R, respectively, data values of said modified scanned pattern being equal to said last R or first R, respectively, data values of an unmodified master pattern to which said modified scanned pattern is to be compared in said second comparing step; and wherein said modified versions of one or more of said unmodified master patterns each comprise a sequence of data values; each of said modified master patterns having data values which are equal to said data values of a corresponding unmodified master pattern but which are offset in their sequence positions by a predetermined number, R; either said first R or last R data values of said unmodified master patterns not appearing in said modified master patterns; and either said last R or first R, respectively, data values of said modified master patterns being equal to said last R or first R, respectively, data values of said unmodified scanned pattern to which said modified master patterns are to be compared in said second comparing step.

14. The method of claim 13 wherein a modified version of said unmodified scanned pattern is compared with one or more of the unmodified master patterns during said second comparing step.

15. The method of claim 14 wherein said scanned pattern is generated by optically scanning a bill.

16. An improved method of identifying one or more currency bills for use in identification systems which compare a scanned pattern with one or more master patterns comprising the steps of:

comparing an unmodified scanned pattern to one or more unmodified master patterns, said patterns comprising a sequence of data values representing analog variations of characteristic information along a segment of a bill, each of said data values having an associated sequence position, said unmodified scanned pattern being associated with a bill under test and said one or more unmodified master patterns being associated with one or more genuine bills;

identifying said bill under test associated with said unmodified scanned pattern based on said step of comparing where said unmodified scanned pattern sufficiently matches one of said unmodified master patterns; and where the identity of said bill under test has not been determined as a result of said identifying step:

designating either said unmodified scanned pattern or said one or more unmodified master patterns for modification; wherein, when said unmodified scanned pattern is designated, said unmodified scanned pattern being a designated unmodified scanned pattern and said one or more unmodified master patterns being non-designated unmodified master patterns; and wherein, when said one or more unmodified master patterns are designated, said one or more unmodified master patterns being designated unmodified master patterns and said unmodified scanned pattern being a non-designated unmodified scanned pattern;

generating one or more working patterns equal to the number of unmodified master patterns, said working patterns being either replications of said unmodified scanned pattern where said designated pattern is said unmodified scanned pattern or said one or more unmodified master patterns where said designated patterns are said one or more unmodified master patterns;

generating either a modified scanned pattern associated with each of said one or more unmodified master patterns where said designated pattern is said unmodified scanned pattern or one or more modified master patterns where said designated patterns are said unmodified master patterns, comprising the steps of:

removing one or more data values from one end of the sequence of data values of each of said working patterns; and inserting at the opposite end of the sequences of data values of each of said working patterns a number of data values, R, equal to the number of data values removed from each working pattern, the R data values at said opposite end being set equal to selected data values of associated non-designated unmodified master patterns where said unmodified scanned pattern has been designated for modification or the R data values at said opposite end being set equal to selected data values of said non-designated unmodified scanned pattern where said one or more unmodified master patterns have been designated for modification, said selected data values having the same sequence positions in said non-designated unmodified scanned pattern or said non-designated unmodified master patterns as said sequence positions of said working patterns which are set equal thereto;

comparing the generated modified scanned patterns to said unmodified master patterns associated therewith or the generated one or more modified master patterns to said unmodified scanned pattern;

identifying a bill under test based on said second comparing step where one of the generated modified scanned patterns sufficiently matches an associated unmodified master pattern or said unmodified scanned pattern sufficiently matches one of said modified master patterns; and where the identity of said bill under test has not been determined as a result of said second identifying step, repeating, up to a predetermined number of iterations, I being the iteration number, said second generating, second comparing, and second identifying steps, wherein said inserting step is modified so that the R×I data values, instead of the R data values, at said opposite end are set equal to R×I selected data values.

17. The method of claim 16 wherein said designated pattern is said unmodified scanned pattern.

18. The method of claim 17 wherein said scanned pattern is generated by optically scanning a bill.

19. An improved method of identifying one or more currency bills for use in identification systems which compare a scanned pattern with one or more master patterns comprising the steps of:

comparing an unmodified scanned pattern to one or more of M master patterns, M being greater than or equal to one, the patterns comprising a sequence of N data values representing analog variations of characteristic information along a segment of a bill, each of said data values having an associated sequence position P, said unmodified scanned pattern being associated with a bill under test, and said one or more master patterns being associated with one or more genuine bills;

identifying said bill under test associated with said unmodified scanned pattern based on said step of comparing where said unmodified scanned pattern sufficiently matches one of said master patterns; and where the identity of said bill under test has not been determined as a result of said identifying step:

designating M1 of said M master patterns for further processing, M1 being greater than or equal to one and less than or equal to M;

designating either said unmodified scanned pattern or said M1 master patterns for modification, wherein, when said unmodified scanned pattern is designated, said unmodified scanned pattern being a designated unmodified scanned pattern and said M1 master patterns being non-designated M1 master patterns; and wherein, when said M1 master patterns are designated, said M1 master patterns being designated M1 master patterns and said unmodified scanned pattern being a non-designated unmodified scanned pattern;

generating M1 working patterns, said working patterns either being replications of said unmodified scanned pattern where said designated pattern is said unmodified scanned pattern or being said M1 master patterns or replications thereof where said designated patterns are said M1 master patterns;

setting an iteration value I equal to one;

successively generating modified working patterns and comparing said modified working patterns with said non-designated unmodified scanned pattern or corresponding non-designated M1 master patterns until the identity of said bill under test may be determined, up to a maximum of T times, wherein said modified working patterns correspond to either modified scanned patterns associated with each of said M1 master patterns where said designated pattern is said unmodified scanned pattern or M1 modified master patterns where said designated patterns are said M1 master patterns, comprising the steps of:

removing I×R data values from one end of the sequence of data values of each of said working patterns; and inserting I×R data values at the opposite end of the sequence of data values of each of said working patterns;

setting the I×R data values at said opposite end equal to either selected data values of associated non-designated M1 master patterns where said unmodified scanned pattern has been designated for modification or selected data values of said non-designated unmodified scanned pattern where said M1 master patterns have been designated for modification, said selected data values having the same sequence positions in said non-designated unmodified scanned pattern or non-designated M1 master patterns as said sequence positions of said working patterns set equal thereto;

comparing said generated working patterns to said non-designated unmodified scanned pattern or said non-designated M1 master patterns associated therewith;

identifying said bill under test based on said step of comparing working patterns where one of said generated workings patterns sufficiently matches an associated non-designated pattern; and where the identity of said bill under test has not been determined as a result of said second identifying step:

increasing I by one; and repeating said second generating, second comparing, and second identifying steps as long as I is less than or equal to T.

20. The method of claim 19 wherein said designated pattern is said unmodified scanned pattern.

21. The method of claim 20 wherein said scanned pattern is generated by optically scanning a bill.

22. The method of claim 19 wherein the sequences of data values of the scanned and master patterns have a leading end and a trailing end, said leading end data values corresponding to the data values first retrieved from a bill and said trailing end data values corresponding to the data values last retrieved from a bill; wherein said R removed data values are leading end data values corresponding to sequence positions ranging from P=1 to P=R×I; and wherein said selected data values are trailing end data values corresponding to sequence positions ranging from P=N−(I×R)+1 to P=N.

23. The method of claim 22 wherein said designated pattern is said unmodified scanned pattern.

24. The method of claim 23 wherein R=1.

25. The method of claim 23 wherein R=2.

26. An improved method for discriminating among currency bills of different denominations, comprising the steps of:

illuminating a predetermined section of a currency bill by focusing at least one strip of light thereupon;

detecting the light reflected off said illuminated section of said bill to generate an analog reflectance signal;

generating relative displacement between said strip of light and said currency bill so as to illuminate or optically scan successive sections of said bill along a predetermined dimension thereof;

obtaining a series of analog reflectance signals corresponding to light reflected from each of said successive bill sections using said strip of light;

digitizing and processing said series of analog reflectance signals to yield a sequence of digital data samples which, in combination, represent an unmodified scanned pattern characteristic of the currency denomination of said bill, each of said data samples having an associated sequence position;

generating and storing a set of unmodified master patterns corresponding to optical scanning of genuine bills of each of the different currency denominations to be discriminated, each of said unmodified master patterns comprising a sequence of data samples, each of said data samples having an associated sequence position; and comparing said unmodified scanned pattern to each of said stored unmodified master patterns to determine the degree of correlation therebetween, and identifying the denomination of said currency bill based on said step of comparing where a sufficient match is obtained; and where the denomination of said currency bill has not been determined as a result of said identifying step:

comparing either the unmodified scanned pattern with modified versions of one or more of said modified master patterns or a modified version of the unmodified scanned pattern with one or more of said unmodified master patterns; and identifying the denomination of said currency bill based on said second comparing step where a sufficient match is obtained;

wherein said modified version of the unmodified scanned pattern comprises a sequence of data samples; said modified scanned pattern having data samples which are equal to the data samples of the unmodified scanned pattern but which are offset in their sequence positions by a predetermined number, R; either the first R or last R data samples of the unmodified scanned pattern not appearing in the modified scanned pattern; and either the last R or first R, respectively, data samples of said modified scanned pattern being equal to the last R or first R, respectively, data samples of an unmodified master pattern to which said modified scanned pattern is to be compared in said second comparing step; and wherein said modified versions of one or more of the unmodified master patterns each comprise a sequence of data samples; each of said modified master patterns having data samples which are equal to the data values of a corresponding unmodified master pattern but which are offset in their sequence positions by a predetermined number, R; either the first R or last R data samples of the unmodified master patterns not appearing in the modified master patterns; and either the last R or first R, respectively, data samples of said modified master patterns being equal to the last R or first R, respectively, data samples of the unmodified scanned pattern to which said modified master patterns are to be compared in said second comparing step.

27. The method of claim 26 wherein a modified version of said unmodified scanned pattern is compared with one or more of the unmodified master patterns during said second comparing step.

28. A currency discriminating device comprising:
a detection circuitry for detecting characteristic information from a scanned bill;
a memory for storing at least one unmodified master pattern of characteristic information for each of a plurality of denominations of genuine bills, each of said unmodified master patterns comprising a sequence of data values, each of said data values having an associated sequence position; and
a signal processing means for
(1) generating an unmodified scanned pattern from said characteristic information detected from said scanned bill, said unmodified scanned pattern comprising a sequence of data values, each of said data values having an associated sequence position;
(2) performing a comparison whereby said unmodified scanned pattern is compared with at least one of said unmodified master patterns; and
(3) indicating the denomination of said scanned bill based on said comparison where a sufficient match is obtained or
(a) performing a second comparison whereby either said unmodified scanned pattern is compared with a modified version of at least one of said unmodified master patterns or at least one of said unmodified master patterns is compared with a modified version of said unmodified scanned pattern;
(b) identifying the denomination of said currency bill based on said second comparison where a sufficient match is obtained;
wherein said modified version of the unmodified scanned pattern comprises a sequence of data values; said modified scanned pattern having data values which are equal to the data values of the unmodified scanned pattern but which are offset in their sequence positions by a predetermined number, R; either the first R or last R data values of the unmodified scanned pattern not appearing in the modified scanned pattern; and either the last R or first R, respectively, data values of said modified scanned pattern being equal to the last R or first R, respectively, data values of an unmodified master pattern to which said modified scanned pattern is to be compared in said second comparison; and
wherein said modified version of at least one of said unmodified master patterns comprises a sequence of data values; said modified master pattern having data values which are equal to the data values of a corresponding unmodified master pattern but which are offset in their sequence positions by a predetermined number, R; either the first R or last R, respectively, data values of the unmodified master pattern not appearing in said modified master pattern; and either the last R or first R, respectively, data values of said modified master pattern being equal to the last R or first R data values of the unmodified scanned pattern to which said modified master pattern is to be compared in said second comparison.

29. The device of claim 28 wherein at least one of said unmodified master patterns is compared with a modified version of said unmodified scanned pattern during said second comparison.

30. A currency discriminating device comprising:
a light source for illuminating a strip of a preselected segment of a scanned bill;
a detector for detecting characteristic information from said scanned bill, said characteristic information being the intensity of light reflected from said scanned bill, said detector receiving reflected light from the illuminated strip on said scanned bill and producing a scanned signal representing variations in the intensity of the reflected light;
means for sampling said scanned signal at preselected intervals, each of said scanned signal samples being proportional to the intensity of the light reflected from a different strip of said preselected segment of said scanned bill;
a memory for storing at least one unmodified master pattern of a sequence stored intensity signal samples for each of a plurality of denominations of genuine bills, each of said stored intensity signal samples being proportional to the intensity of the light reflected from a different strip of said preselected segment of a genuine bill of a given denomination, each of said samples having an associated sequence position; and
a signal processing means for
(1) receiving said scanned signal samples;
(2) generating an unmodified scanned pattern from said scanned signal samples, said unmodified scanned pattern comprising a sequence of scanned signal samples, each of said scanned signal samples having an associated sequence position;
(3) comparing at least a portion of said unmodified scanned pattern with at least a portion of at least one of said unmodified master patterns of stored intensity signal samples; and
(4) indicating the denomination of said scanned bill based on said comparison where a sufficient match is obtained or
(a) performing a second comparison whereby either at least a portion of said unmodified scanned pattern is compared with at least a portion of a modified version of at least one of said unmodified master patterns or at least a portion of at least one of said unmodified master patterns is compared with at least a portion of a modified version of said unmodified scanned pattern; and
(b) identifying the denomination of said currency bill based on said second comparison where a sufficient match is obtained;
wherein said modified version of the unmodified scanned pattern comprises a sequence of signal samples; said modified scanned pattern having signal samples which are equal to the signal samples of the unmodified scanned pattern but which are offset in their sequence positions by a predetermined number, R; either the first R or last R signal samples of the unmodified scanned pattern not appearing in the modified scanned pattern; and either the last R or first R, respectively, signal samples of said modified scanned pattern being equal to the last R or first R, respectively, signal samples of an unmodified master pattern to which said modified scanned pattern is to be compared in said second comparison; and
wherein said modified version of said at least one of said unmodified master patterns comprises a sequence of signal samples; said modified master pattern having signal samples which are equal to the signal samples of a corresponding unmodified master pattern but which are offset in their sequence positions by a predetermined number, R; either the first R or last R signal samples of the unmodified master pattern not appearing in said modified master pattern; and either the last R or first R, respectively, signal samples of said modified master pattern being equal to the last R or first R, respectively, signal samples of the unmodified scanned pattern to which said modified master pattern is to be compared in said second comparison.

31. The device of claim 30 wherein at least a portion of at least one of said unmodified master patterns is compared with at least a portion of a modified version of said unmodified scanned pattern during said second comparison.

32. A currency discrimination device comprising:

a bill separating station for receiving currency bills from a bill accepting station and feeding said bills, one at a time, to a bill transport mechanism, said bill transport mechanism transporting bills from said bill separating station to a stacking station;

an optical scanning head located between said bill separating and stacking stations for scanning a preselected segment of each bill transported between said stations by said transport mechanism, said scanning head including at least one light source for illuminating a strip of said preselected segment of a bill and at least one intensity detector for receiving reflected light from the illuminated strip on said scanned bill, said intensity detector producing an intensity output signal representing variations in the intensity of the reflected light;

means for sampling said intensity output signal at preselected intervals as a bill is moved across said scanning head, said intensity output signal samples being proportional to the intensity of the light reflected from a different strip of said preselected segment of a bill;

a memory for storing unmodified master patterns of intensity signal samples, said unmodified master patterns corresponding to a plurality of denominations; each of said unmodified master patterns being derived by scanning said preselected segments of one or more genuine bills with said scanning head and sampling said intensity output signals at said preselected intervals, said unmodified master patterns comprising a sequence of output signal samples being proportional to the intensity of the light reflected from a different strip of said preselected segment of a bill and received by said intensity detectors, each of said output signal samples having an associated sequence position; and signal processing means for
 (1) receiving said output intensity signal samples;
 (2) generating an unmodified scanned pattern from said output intensity signal samples, said unmodified scanned pattern comprising a sequence of signal samples, each of said signal samples having an associated sequence position;
 (3) comparing at least a portion of said unmodified scanned pattern with at least a portion of at least one of said unmodified mater patterns of intensity signal samples; and
 (4) indicating the denomination of said scanned bill based on said comparison where a sufficient match is obtained or
  (a) performing a second comparison whereby either at least a portion of said unmodified scanned pattern is compared with at least a portion of a modified version of at least one of said unmodified master patterns or at least a portion of at least one of said unmodified master patterns is compared with at least a portion of a modified version of said unmodified scanned pattern;
  (b) identifying the denomination of said currency bill based on said second comparison where a sufficient match is obtained;

wherein said modified version of the unmodified scanned pattern comprises a sequence of signal samples; said modified scanned pattern having signal samples which are equal to the signal samples of the unmodified scanned pattern but which are offset in their sequence positions by a predetermined number, R; either the first R or last R signal samples of the unmodified scanned pattern not appearing in the modified scanned pattern; and either the last R or first R, respectively, signal samples of said modified scanned pattern being equal to the last R or first R, respectively, signal samples of an unmodified master pattern to which said modified scanned pattern is to be compared in said second comparison; and wherein said modified version of at least one of said unmodified master patterns comprises a sequence of signal samples; said modified master pattern having signal samples which are equal to the signal samples of a corresponding unmodified master pattern but which are offset in their sequence positions by a predetermined number, R; either the first R or last R signal samples of the unmodified master pattern not appearing in said modified master pattern; and either the last R or first R, respectively, signal samples of said modified master pattern being equal to the last R or first R, respectively, signal samples of the unmodified scanned pattern to which said modified master pattern is to be compared in said second comparison.

33. The device of claim 32 wherein at least a portion of at least one of said unmodified master patterns is compared with at least a portion of a modified version of said unmodified scanned pattern during said second comparison.

* * * * *